United States Patent
Hashi et al.

(10) Patent No.: US 6,994,029 B2
(45) Date of Patent: Feb. 7, 2006

(54) MAGNETIC TRANSFER METHOD AND MAGNETIC TRANSFER DEVICE

(75) Inventors: Hideyuki Hashi, Osaka (JP); Taizo Hamada, Osaka (JP); Toshio Makabe, Kyoto (JP); Kiyokazu Toma, Osaka (JP); Tatsuaki Ishida, Shiga (JP); Yasuaki Ban, Osaka (JP); Keizo Miyata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 224 days.

(21) Appl. No.: 10/654,500

(22) Filed: Sep. 3, 2003

(65) Prior Publication Data

US 2004/0040458 A1  Mar. 4, 2004

Related U.S. Application Data

(63) Continuation of application No. 09/720,146, filed as application No. PCT/JP00/02679 on Apr. 25, 2000, now Pat. No. 6,665,133.

(30) Foreign Application Priority Data

Apr. 26, 1999  (JP)  ................................. 11-117819
Sep. 28, 1999  (JP)  ................................. 11-274204

(51) Int. Cl.
*B41M 1/10*  (2006.01)
(52) U.S. Cl. ........................ 101/489; 101/425; 360/17; 360/133
(58) Field of Classification Search ................ 101/489, 101/425, 485, 486; 360/17, 133, 137; 428/692, 428/694 T
See application file for complete search history.

(56) References Cited

U.S. PATENT DOCUMENTS 6,212,023 B1  4/2001  Bonyhard
6,529,341 B1  3/2003  Ishida et al.

FOREIGN PATENT DOCUMENTS

| JP | 10-040544 | 2/1998 |
|----|-----------|--------|
| JP | 10-040544 A | 2/1998 |
| JP | 10-162360 | 6/1998 |
| JP | 10-162360 A | 6/1998 |
| JP | 11-175973 A | 7/1998 |

(Continued)

OTHER PUBLICATIONS

International Search Report for Application No. PCT/JP00/02679 mailed Aug. 8, 2000.
Australian Patent Office Search Report for Application No. SG 200006913-08 mailed Oct. 3, 2001.

*Primary Examiner*—Ren Yan
(74) *Attorney, Agent, or Firm*—RatnerPrestia

(57) ABSTRACT

A magnetic transfer method which superposes on a magnetic disk surface a magnetic transfer master disk (2) on which a magnetic film is formed so as to have an array pattern shape corresponding to a preset information signal, and magnetizes the magnetic film on the master disk (2) to thereby magnetic-transfer-record the array pattern of the information signal on the master disk (2) onto the magnetic disk as the magnetized pattern of the information signal, the method characterized by comprising a step of contacting/separating to/from a dummy disk (1) the magnetic film-formed surface of the master disk (2) to thereby clean the master disk (2), and a step of superposing, after the cleaning, the master disk (2) on the magnetic disk for magnetic transfer recording; and a magnetic transfer device for the method.

2 Claims, 22 Drawing Sheets

FOREIGN PATENT DOCUMENTS

| | | |
|---|---|---|
| JP | 10-320768 | 12/1998 |
| JP | 10-320768 A | 12/1998 |
| JP | 11-025455 | 1/1999 |
| JP | 11-25455 A | 1/1999 |
| JP | 11-296849 A | 10/1999 |
| JP | 11-316944 A | 11/1999 |
| JP | 2000-67433 A | 3/2000 |
| JP | 2000-195046 A | 7/2000 |
| JP | 2000-195047 A | 7/2000 |
| JP | 2000-195048 A | 7/2000 |

Initial state

After 100,000cycles of suction / force-feed

Initial state

After 100,000cycles of suction / force-feed

180
MAGNETIC TRANSFER METHOD AND MAGNETIC TRANSFER DEVICE

This application is a continuation of U.S. application Ser. No. 09/720,146 filed Mar. 9, 2001 now U.S. Pat. No. 6,665,133, which is a U.S. National Phase Application of PCT International Application PCT/JP00/02679.

FIELD OF THE INVENTION

The present invention relates to a method of magnetic transfer and an apparatus for magnetic transfer for magnetic transferring in a process of manufacturing magnetic discs used for hard disc devices and floppy disc devices.

As a typical magnetic disc device, there have already been commercialized presently some of hard disc drives having a surface recording density exceeding 1 Gigabit/sq-in, and rapid technological advancement is strongly in evidence as there are discussions about practical use of 10 Gigabit/sq-in within a few years.

In the technological background, what has enabled such a high recording density is dependent largely upon magneto-resistive element heads that are capable of reproducing signals in only a few μm of track width with a high signal-to-noise ratio, besides improvements in the track recording density.

In addition, there have been demands for reduction in amount of flotage of a floating magnetic slider with respect to a magnetic recording medium in keeping with high recording density, as there are increasing a possibility of physical interactions that can occur between the disc and the slider for certain factors even while floating. Under such circumstances, there has been a demand for further smoothness of the recording media.

Here, tracking servo techniques of the head play an important role in order for the head to accurately scan a narrow track. In a currently available hard disc drive using such tracking servo techniques, a servo signal for tracking, an address data signal, a reproduction clock signal and the like are recorded at regular angular intervals in a round of the disc. A driving device detects and corrects a position of the head using these signals reproduced by the head at predetermined time intervals, thereby enabling the head to scan over the track accurately.

Since the above-described servo signal, the address data signal, the reproduction clock signal and the like are used as reference signals for the head to scan accurately over the track, a high positioning accuracy is required for writing them (hereinafter referred to as "formatting"). In the current hard disc drives, formatting is made with a special-purpose servo device (henceforth "servo writer") equipped therein with a highly accurate position detecting device, which utilizes optical interference to position the recording head.

However, the following problems exist in the formatting made by the servo writer.

First, it takes a considerable time to write signals over a large number of tracks while positioning the head with a high accuracy. It is therefore necessary to operate many servo writers at the same time in order to increase productivity.

Secondly, it costs a large amount of money to provide a large number of the servo writers and to maintain them. These problems become more serious the more the number of tracks increases as a track density improves.

Hence, there has been proposed a method in that a disc called master disc, on which a complete servo data is written in advance, is overlapped with a magnetic disc to be formatted, and the data on the master disc is transferred into the magnetic disc in batch by externally impressing energy for the magnetic transfer, thus formatting is performed instead of using a servo writer.

A magnetic transfer apparatus described in Japanese Patent Laid-Open Publication, No. H10-40544, is now cited as an example.

The above publication discloses a method including the steps of forming a magnetic area composed of ferromagnetic material in a shape of a pattern corresponding to data signals on a surface of a substrate to prepare a master disc for magnetic transfer, making the surface of the master disc for magnetic transfer to be in contact with a surface of a magnetic recording medium of either a sheet-form or a disc-form whereon either a ferromagnetic thin film or a coated layer of ferromagnetic powder is formed, and recording on a magnetic recording medium a magnetized pattern in a shape of the pattern corresponding to the data signals formed on the master disc for magnetic transfer by applying a magnetic field of a predetermined magnitude.

However, since there is normally a clearance of approximately 30 nm between the head and a surface of the disc when the disc is in rotation, it is therefore necessary to keep unevenness on the surface of the disc within a maximum of approximately 20 nm. The magnetic head may come in contact with the magnetic recording medium during recording and reproducing the data, if any bumps larger than the above exist on the magnetic recording medium. In such a case, a space between the magnetic head and the magnetic disc increases at the instant of contact, and causes performance of recording and reproducing signals to decrease. It has also been a cause of shortening a useful life of the magnetic head, as the magnetic head makes physical contact with the magnetic disc.

In other words, although the magnetic transfer apparatus disclosed in Japanese Patent Laid-Open Publication, No. H10-40544, can complete the formatting instantly, it requires a strict surface control, on the other hand, in order to ensure practical use with the foregoing clearance between the head and the disc, since the master disc for magnetic transfer and the magnetic disc come in contact over the entire surfaces.

In addition, disc-shaped recording media such as magnetic discs, magneto-optical discs, optical discs and the like are advancing toward higher performance such as downsizing, thinning, increased capacity and so on in recent years, and demands for higher density recording media have been rising in keeping pace with the advancement as described above. Disc-shaped recording media having high accuracy and high reliability are necessary in order to meet such demands, therefore making it an urgent need to manufacture disc-shaped recording media with outstanding flatness and smoothness, and without adhesion of fine particle, etc. during recording of data.

On the contrary, it is difficult for the above-described magnetic transfer apparatus of the prior art to avoid fine foreign particles from getting into it, even if very strict control is carried out. Such foreign particles have caused small anomalous unevenness on a surface of the master disc or the magnetic disc at a moment the master disc and the magnetic disc to be formatted are overlapped together. Silicon is used generally as material of the master disc. If the magnetic disc is made of a material of lower hardness than that, such as aluminum for example, bumps of foreign particles on the master disc are transferred in shape as dimples on the magnetic disc side, and if on the other hand the magnetic disc is made of a material of higher hardness such as glass for example, foreign particles located on the magnetic disc produce defects on the master disc side.

In the above case, the defects are reproduced on all of magnetic discs to which magnetic transfer is performed, thereby making it difficult to manufacture the magnetic discs of high quality efficiently and steadily.

Accordingly, the present invention is intended to realize a magnetic transfer apparatus that is capable of accurate magnetic transfer in order to manufacture magnetic discs of high quality by decreasing size of such small bumps to a level not to cause the problems, and to prevent errors in recording and reproducing.

SUMMARY OF THE INVENTION

A method of magnetic transfer of the present invention is a manufacturing method including the steps of closely contacting a master disc for magnetic transfer, whereon a magnetic film is formed, with a surface of a magnetic disc, whereon a ferromagnetic layer is formed, and magnetically transferring a pattern of the magnetic film on the master disc for magnetic transfer onto the surface of the magnetic disc using an external magnetic field, wherein the magnetic transfer is carried out by mounting the regular magnetic disc only after repeating suctioning and forced feeding of gas between the master disc for magnetic transfer and a magnetic disc, when making the master disc for magnetic transfer to contact forcibly by using the dummy disc first. Taking this method can maintain a surface of the master disc for magnetic transfer in a smooth condition free from foreign particles and burrs at all the time during magnetic transferring, thereby realizing manufacture of magnetic discs of high quality, as there occurs practically no fine bump to cause problems, as far as the magnetic discs subject to the magnetic transfer are concerned.

Also, the method of magnetic transfer of the present invention further includes defect detection means for detecting defects on a surface of a magnetic disc. When this defect detection means detects defects in number equal to or greater than a predetermined number on the surface of the magnetic disc, the magnetic transferring is carried out by placing it in close contact with a master disc for magnetic transfer, only after repeating an operation of contacting and separating the master disc for magnetic transfer with a dummy disc for a predetermined number of times, and replacing the dummy disc by the magnetic disc not subjected to the magnetic transfer. The above step helps to provide the method of magnetic transfer capable of ensuring the magnetic transferring of high quality into magnetic discs for a long period of time, since it allows a regular maintenance of removing dust and foreign particles on the master disc for magnetic transfer.

Furthermore, in the present invention, a region on the master disc for magnetic transfer where contacting with and separating from the dummy disc is so arranged as to completely cover a magnetic transfer region from the master disc for magnetic transfer to the magnetic disc during magnetic transfer. This realizes manufacture of magnetic discs of high quality, as servo signals are accurately transferred even on a rim in a peripheral area of the magnetic disc.

Moreover, the method of magnetic transfer of the present invention is to carry out the magnetic transfer by placing the master disc for magnetic transfer in close contact with a magnetic disc, only after repeating an operation of contacting and separating a dummy master disc with the magnetic disc for a predetermined number of times, and replacing the dummy master disc by the master disc for magnetic transfer. This method is able to remove foreign particles on the magnetic disc, thereby realizing an accurate magnetic transfer while assuring a remarkably smooth surface and high reliability.

Furthermore, an apparatus for magnetic transfer of the present invention is to make a master disc for magnetic transfer, whereon a magnetic film is formed on at least one of surfaces thereof, in close contact with a magnetic disc, and to magnetically transfer a pattern of the magnetic film on the master disc for magnetic transfer onto the magnetic disc by applying an external magnetic field. The apparatus for magnetic transfer includes the master disc for magnetic transfer whereon a predetermined data to be transferred is written, a retainer slidably positioned on a guide member for retaining the master disc for magnetic transfer, a support base provided with a vent hole for supporting the magnetic disc or a dummy disc, a feeding unit for supplying gas into the vent hole provided in the support base, an exhaust unit for evacuating gas through the vent hole, and a magnet for applying magnetic field for the magnetic transfer. The foregoing structure is able to maintain a surface of the master disc for magnetic transfer in a smooth condition free from foreign particles and burrs at all the time during magnetic transferring, thereby realizing manufacture of magnetic discs of high quality as practically no small bump occurs on the magnetic discs subject to the magnetic transfer.

DETAILED DESCRIPTION OF THE PREFERRED EMBODIMENTS

Exemplary embodiments of the present invention are described hereinafter by referring to accompanying figures.

The present invention relates to a method of magnetic transfer and an apparatus for magnetic transfer, wherein magnetic transferring is made by overlapping a master disc for magnetic transfer onto a magnetic disc after the master disc for magnetic transfer is cleaned by closely contacting a surface of the master disc for magnetic transfer, on which surface a magnetic film is formed, with a dummy disc.

In each of the following exemplary embodiments of the invention, what are described pertain to the method of magnetic transfer for magnetically transferring a pattern of magnetic film of the master disc for magnetic transfer onto a surface of a regular magnetic disc, and the apparatus for magnetic transferring.

First Exemplary Embopdiment

A method of magnetic transfer and an apparatus for magnetic transfer of a first exemplary embodiment of the present invention will now be described by referring to FIG. 1 through FIG. 6.

Figure 1:
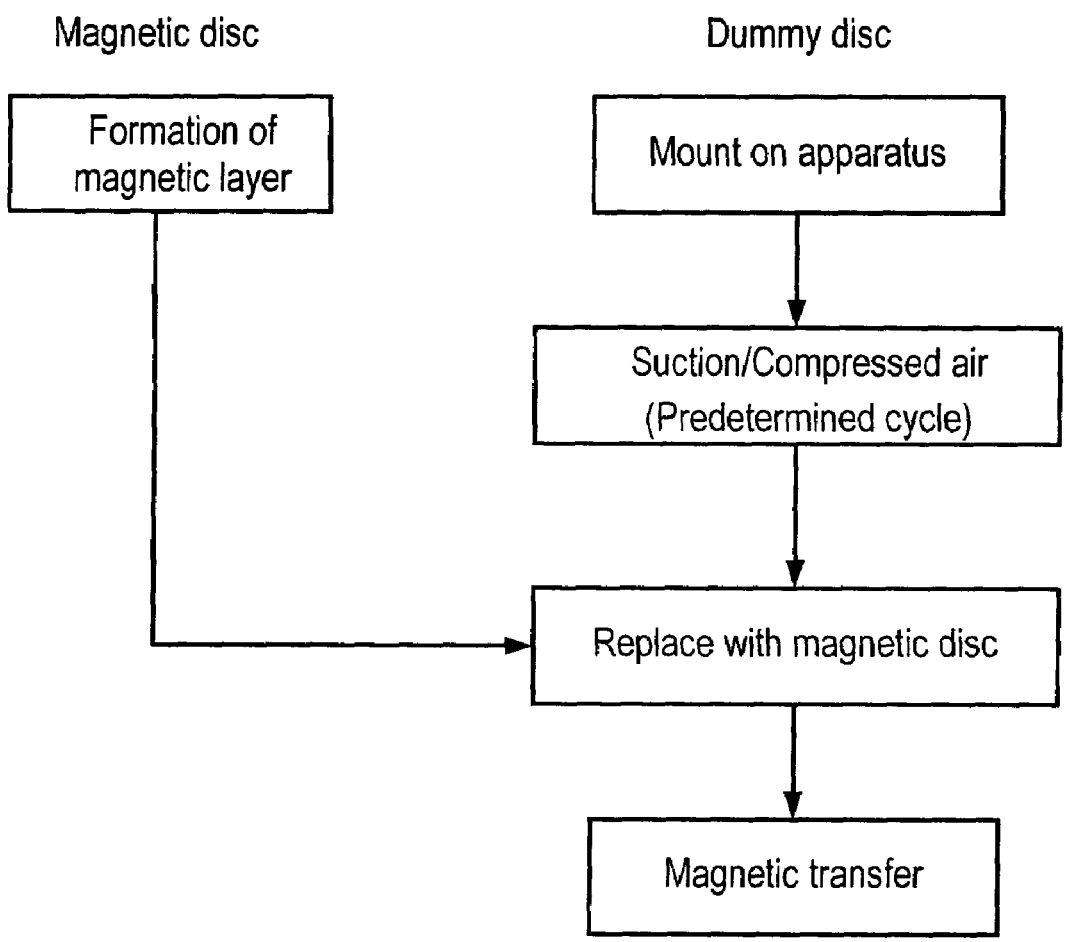
FIG. 1 is a flow chart showing a process in a first exemplary embodiment of the present invention.

FIG. 1 is a flow chart showing the method of magnetic transfer of this exemplary embodiment. In FIG. 1, at first a ferromagnetic thin film composed of cobalt, for instance, or the like is formed as a magnetic layer on a surface of a regular magnetic disc (hereinafter referred to as "magnetic disc") by a known method such as the sputtering method.

On the other hand, a dummy disc is installed in the magnetic transferring apparatus (hereinafter, "apparatus"). Suctioning and forced feeding between both discs are repeated after a master disc for magnetic transfer (hereinafter, "master disc") is brought close to a dummy disc, and magnetic transfer is carried out after the dummy disc is replaced with the magnetic disc. Here it is premised that the master disc is installed in the apparatus in advance.

Next, a process shown in FIG. 1 for magnetic transfer will be described in detail by using FIG. 2 to FIG. 5.

Figure 2:
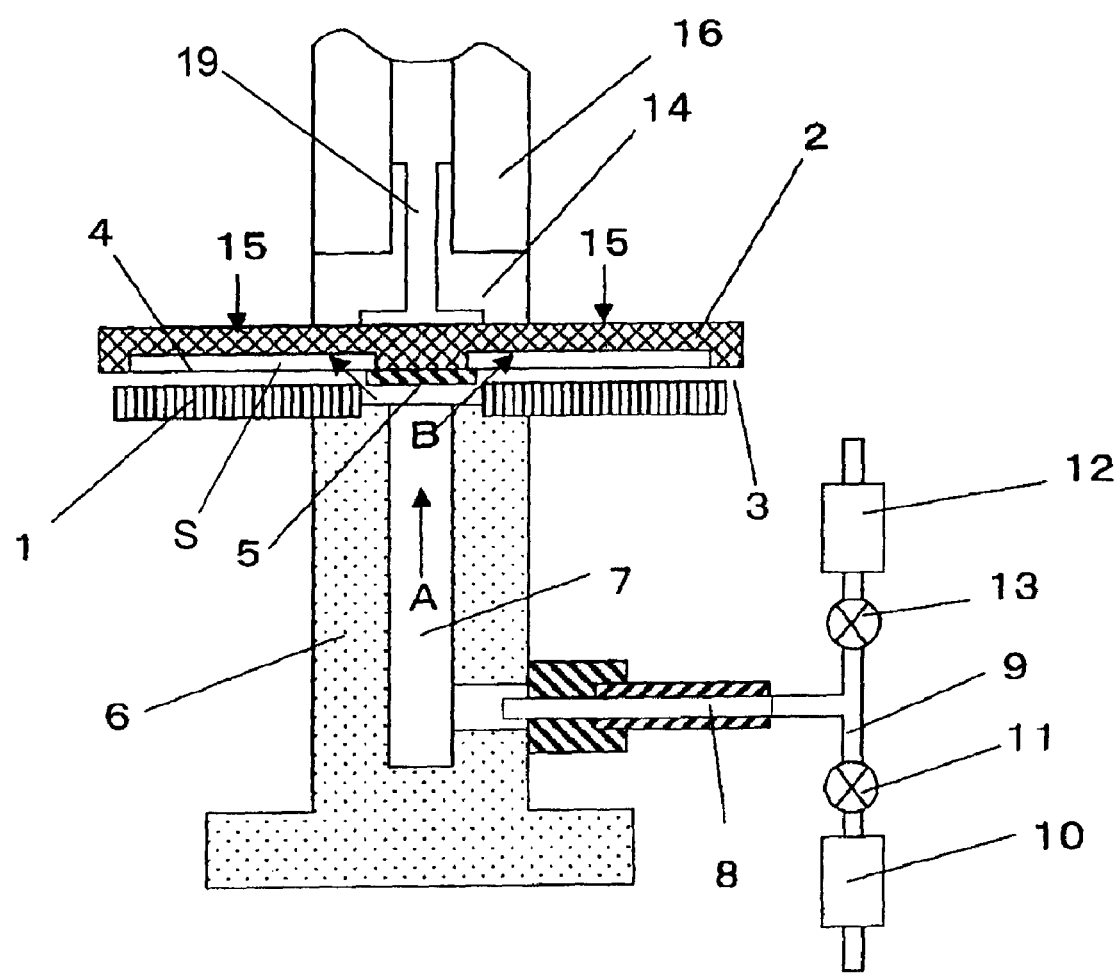
FIG. 2 is a sectional view of a magnetic transfer apparatus of the first exemplary embodiment of the invention.
Figure 3:
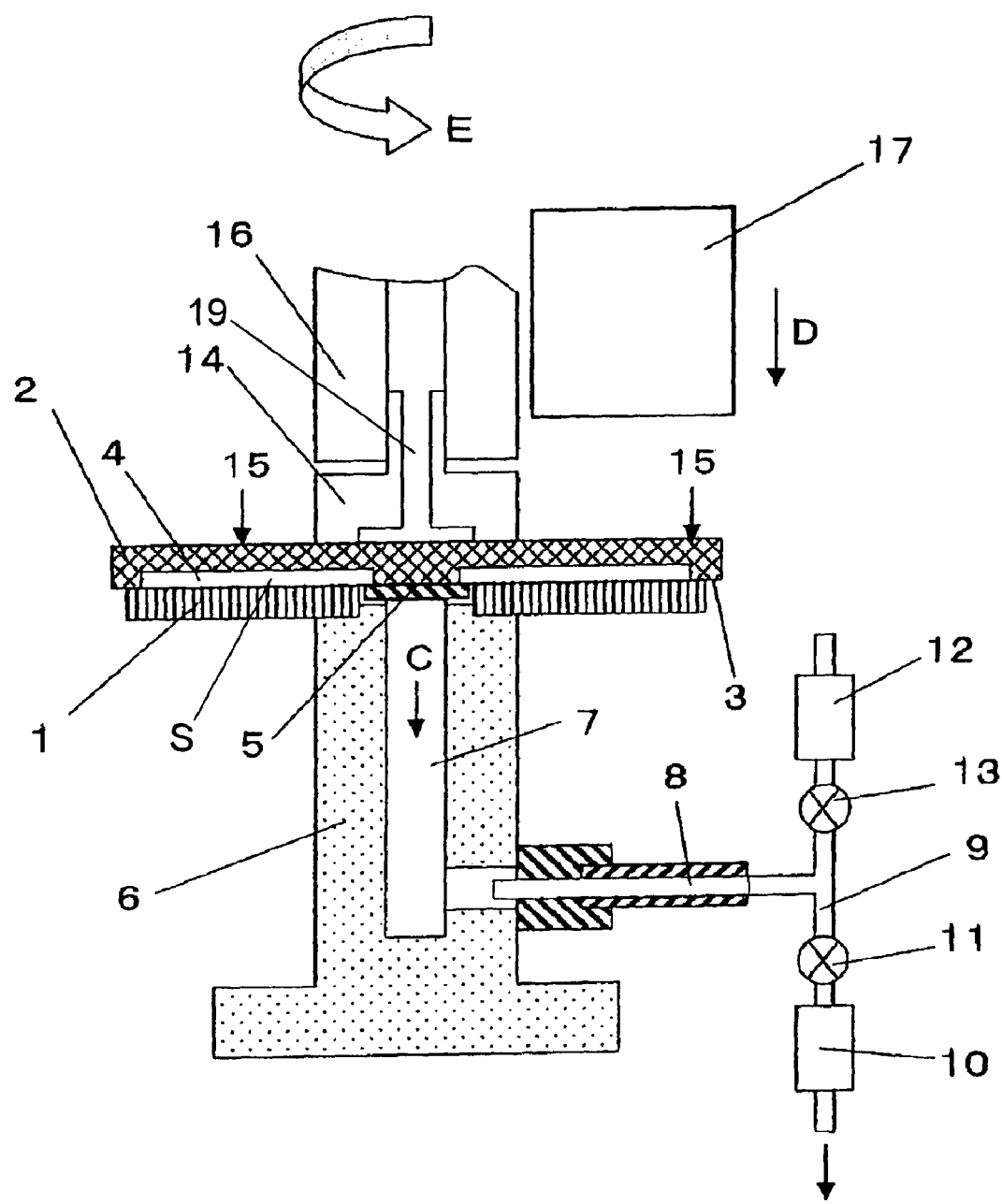
FIG. 3 is a sectional view of the magnetic transfer apparatus depicting a state wherein a master disc for magnetic transfer and a dummy disc are closely in contact with each other in the magnetic transfer apparatus of FIG. 2.
Figure 4:
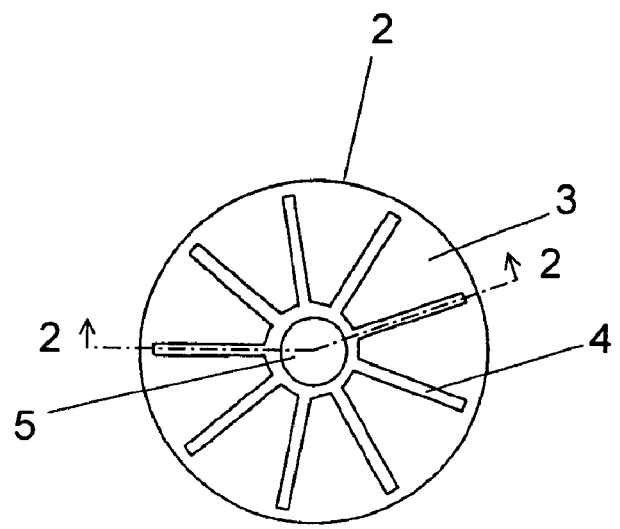
FIG. 4 is an illustration depicting a surface of the master disc for magnetic transfer to be in contact with the magnetic disc in the first exemplary embodiment of the invention.

FIG. 2 is a sectional view of the magnetic transfer apparatus of this exemplary embodiment, showing a state wherein the master disc and the dummy disc are separated with respect to each other. FIG. 3 shows another state when the master disc 2 and the dummy disc 1 are in close contact with each other. FIG. 4 is an illustration depicting a contact surface 3 of the master disc 2, with which the magnetic disc contacts, and grooves 4 extend radially from the center of the master disc 2. A depth of the grooves is set for approximately 5 μm in this exemplary embodiment.

In FIG. 2, the dummy disc 1 is replaced with a magnetic disc after a process of suctioning and forced feeding. Aluminum is used as material of the dummy disc. Silicon is used as material of the master disc 2, as it is desirable because silicon has higher hardness than aluminum. The grooves 4 (refer to FIG. 4) extending radially from the center of the master disc 2 are provided in the contact surface 3 to be in contact with the dummy disc 1 on the master disc 2. The master disc 2 illustrated in FIG. 2 represents a surface that is sectioned along a break line 2—2 drawn through the grooves as shown in FIG. 4.

A boss 5 is attached to the center portion of the master disc 2, and it engages in an inner peripheral hole of the dummy disc 1 with a gap. A support base 6 supports the dummy disc 1, and it has a vent hole 7 in a center for flowing air. A passage 8 is for exhausting and forcefully feeding gas between the master disc 2 and the dummy disc 1. The gas is exhausted by a suction pump 10 connected with a gas outlet 9, after passing through the gas outlet 9 and an exhaust valve 11 which controls exhaust of the gas. Further, a feed pump 12 feeds the gas forcefully to the passage 8 through a feed valve 13, and the feed valve 13 controls a supply of the gas. In this embodiment, the feed pump 12 is provided with an air filter of 0.01 $\mu$m, thereby avoiding foreign particles larger than 0.01 $\mu$m from being fed forcefully into the passage 8.

A retaining arm 14 for retaining the master disc 2 holds the master disc 2. Although there are a number of retaining methods including bonding and so on, the master disc 2 may be vacuum-chucked by suctioning gas from a through hole 19 provided in the retaining arm 14, as shown in FIG. 2.

The retaining arm 14 is then positioned in a slidable manner in a vertical direction via an extended portion on an upper part thereof by a guide member 16.

Figure 5:
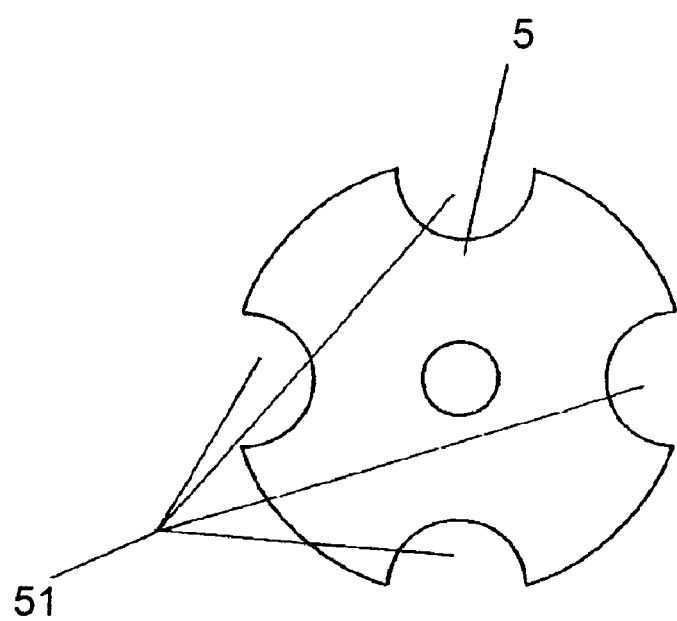
FIG. 5 is an illustration depicting an example of a shape of a boss on the master disc for magnetic transfer in the first exemplary embodiment of the invention.

However, the method of positioning the master disc 2 is not limited to the one using the retaining arm 14, but it can also be achieved, for instance, by fitting an outer periphery of the boss 5 in an inner peripheral hole of the magnetic disc (it is the dummy disc 1 in this process). If this is the case, the boss 5 may be made in a shape as shown in FIG. 5, and the gas between the master disc 2 and the dummy disc 1 is evacuated and force-fed through cut openings 51 provided around periphery of the boss 5.

Next, a process of suctioning and forced feeding will be described in detail by using FIGS. 2 to 4.

Referring to FIG. 2, a process of separation using forced feeding will be described first. The gas is supplied into the passage 8 by operating the feed pump 12 while the exhaust valve 11 is closed and the feed valve 13 opened. This causes air to be fed forcefully into the vent hole 7 in an upward direction as show by an arrow A in FIG. 2. This makes the air fed forcefully into the vent hole 7 to push up the boss 5 upwardly, and the air is fed forcefully further into the grooves 4 as shown by arrows B. The air fed forcefully into the grooves 4 spreads radially from a center toward an outer periphery of the master disc 2 through the grooves 4. And the air gets out into the atmosphere from the grooves 4 by passing further through spaces between the master disc 2 and the dummy disc 1. This flow of the air expels fine foreign particles adhering to the surfaces of the master disc 2 and the dummy disc 1 to the outside together with the gas.

Figure 6:
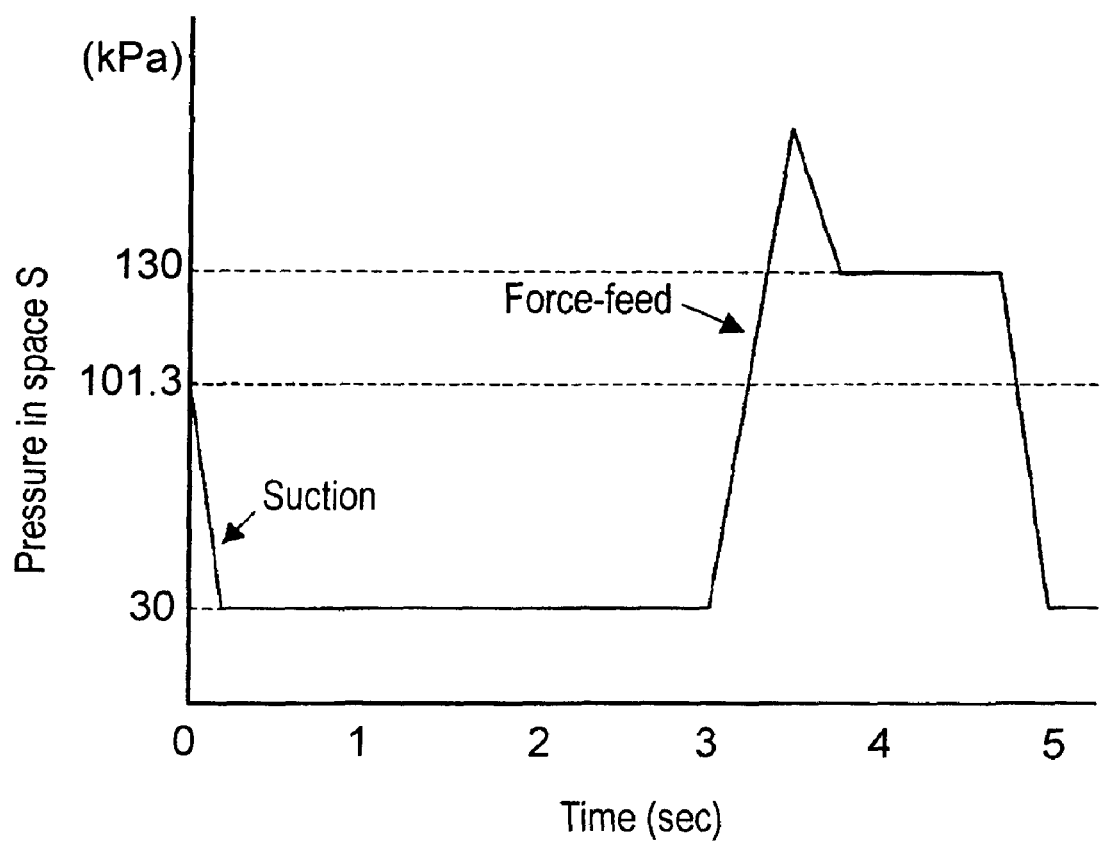
FIG. 6 is a graphical representation showing a change in gas pressure with lapse of time in a space S by suctioning and forced feeding of the gas in the magnetic transfer apparatus of the first exemplary embodiment of the invention.

FIG. 6 shows a relation between lapse of time and gas pressure within the space (hereinafter referred to as "space S") confined between the master disc 2 and the dummy disc 1 when the process is shifted from a suctioning step to a forced feeding step. In FIG. 6, the gas pressure in the space S shoots up rapidly from 30 kPa at about 3 seconds in the lapse of time, and a period of approximately 1 second thereafter, in which the gas pressure of about 130 kPa, higher than the atmospheric pressure, is maintained, corresponds to the state shown in FIG. 2 wherein the master disc 2 and the magnetic disc 1 are separated.

It is desirable, in this state, that the space between the master disc 2 and the dummy disc 1 is set to be as small as possible. It is set to approximately 0.5 mm in this example. Accordingly, fine foreign particles that exist between the master disc 2 and the dummy disc 1 can be expelled reliably to the outside, since flow of the gas between the two is accelerated.

In this exemplary embodiment, a distance between the dummy disc 1 and the master disc 2 is controlled by setting an upper surface of the retaining arm 14 to come in contact with a lower surface of the guide member 16 when the master disc 2, together with the retaining arm 14, rises by 0.5 mm from a position where the master disc 2 is closely in contact with the dummy disc 1.

A process of making a close contact by suctioning will be described next by referring to FIG. 3.

The feed pump 12 is stopped, and the feed valve 13 is shut. This allows the retaining arm 14 holding the master disc 2 to move downwardly by its own weight, and the master disc 2 is disposed on the dummy disc 1 while the boss 5 stays in its engaged position with the inner peripheral hole of the dummy disc 1. Afterwards, the exhaust valve 11 is opened, and the suction pump 10 is operated. This exhausts the gas in the grooves 4, i.e. the space S, through the gap between the inner peripheral hole of the dummy disc 1 and the boss 5, since the gas in the vent hole 7 is exhausted downwardly as shown by an arrow C in FIG. 3.

During this process, the space S is in a state of being sealed airtight, and the pressure is lower than the atmospheric pressure, since the master disc 2 and the dummy disc 1 are in a position of closely in contact with each other over their entire perimeters at their outermost peripheral portions having heavy thickness because the grooves 4 are in such a shape as not to extend through the outer perimeter of the master disc 2, as shown in FIG. 4. The dummy disc 1 is therefore pressed against the master disc 2 by the atmospheric pressure 15 (FIG. 3).

As a result, foreign particles in existence on the dummy disc 1, are caught between the dummy disc 1 and the master disc 2. At this moment, the foreign particles caught between the dummy disc 1 and the master disc 2 lodge in or produce defects on the surface of the dummy disc 1 without damaging the surface of the master disc 2, since hardness of the dummy disc is lower when the dummy disc 1 and the master disc 2 are compared of their hardness. In addition, small anomalous bumps present on the surface of the master disc 2 are made smoother by coming in close contact with the dummy disc 1.

A period in which the gas pressure in the space S is about 30 kPa in FIG. 6 corresponds to the foregoing state of close contact.

However, shape of the grooves 4 needs not be limited to the one described above. A member adaptable to sealing the perimeter of the master disc 2 and the dummy disc 1 may be disposed, if the grooves 4 have a shape extending through the perimeter of the master disc 2.

Next, the process of separation shown in FIG. 2 is carried out again. That is, the exhaust valve 11 is closed, the feed valve 13 is opened, and the feed pump 12 is operated. The gas is then fed forcefully as shown by the arrows A and B, the master disc 2 moves together with the retaining arm 14 by the force of the forced-fed gas, and it stops in the position where the upper surface of the retaining arm 14 comes in contact to the guide member 16. At this moment, the gas remains in the state of being fed forcefully from the center through the grooves 4 radially toward the outer perimeter of the master disc 2. This expels the foreign particles present on the surface of the dummy disc 1 to the outside together with the gas fed forcefully from the feed pump 12.

After the aforementioned suctioning and forced-feeding are repeated for a predetermined number of times, the dummy disc 1 is replaced with a regular magnetic disc, the aforementioned process of suction is executed for the magnetic disc, and a process of imposing magnetic field is carried out while the magnetic disc is in a position of close contact with the master disc 2 as shown in FIG. 3.

In other words, a magnet 17 is moved in a direction of an arrow D as shown in FIG. 3 to a close vicinity of the master disc 2, and the movement toward the direction of arrow D is stopped when a distance to it becomes approximately 1 mm. Next, magnetic field in a magnitude required for the transcription is applied by rotating the magnet 17 by one complete rotation or more in a direction of a circumference of the magnetic disc 100, i.e. a direction of an arrow E.

Figure 7:
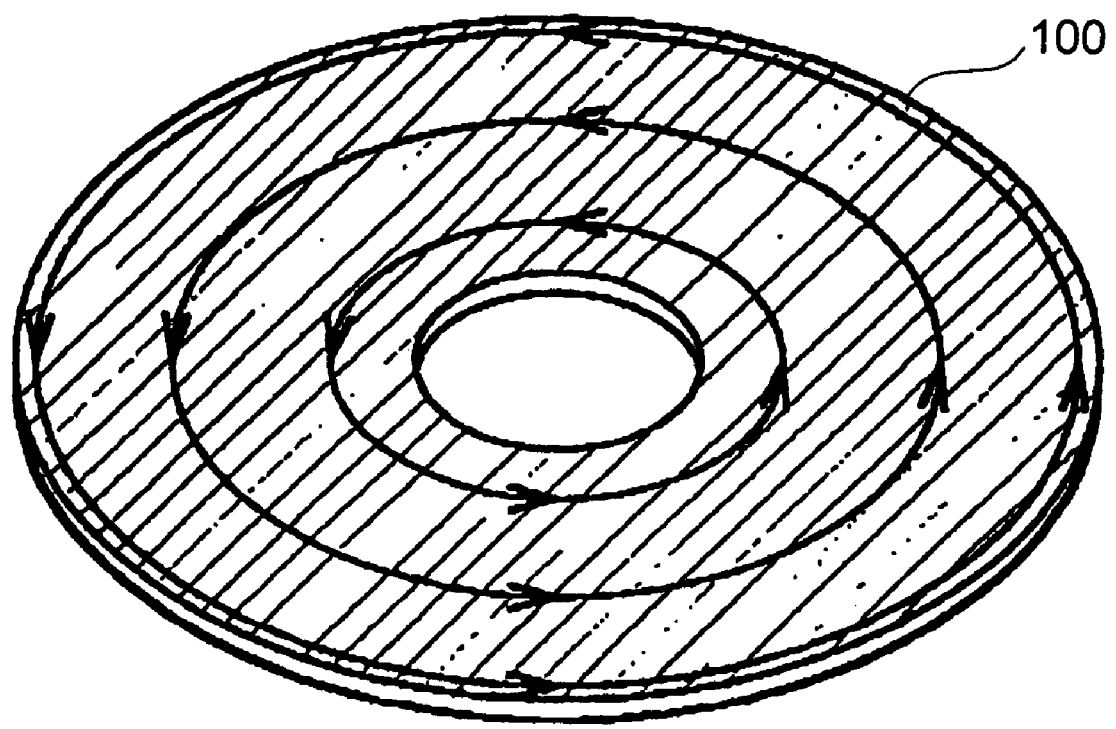
FIG. 7 is a perspective view of a magnetic disc depicting a state wherein it is magnetized in one direction.
Figure 8:
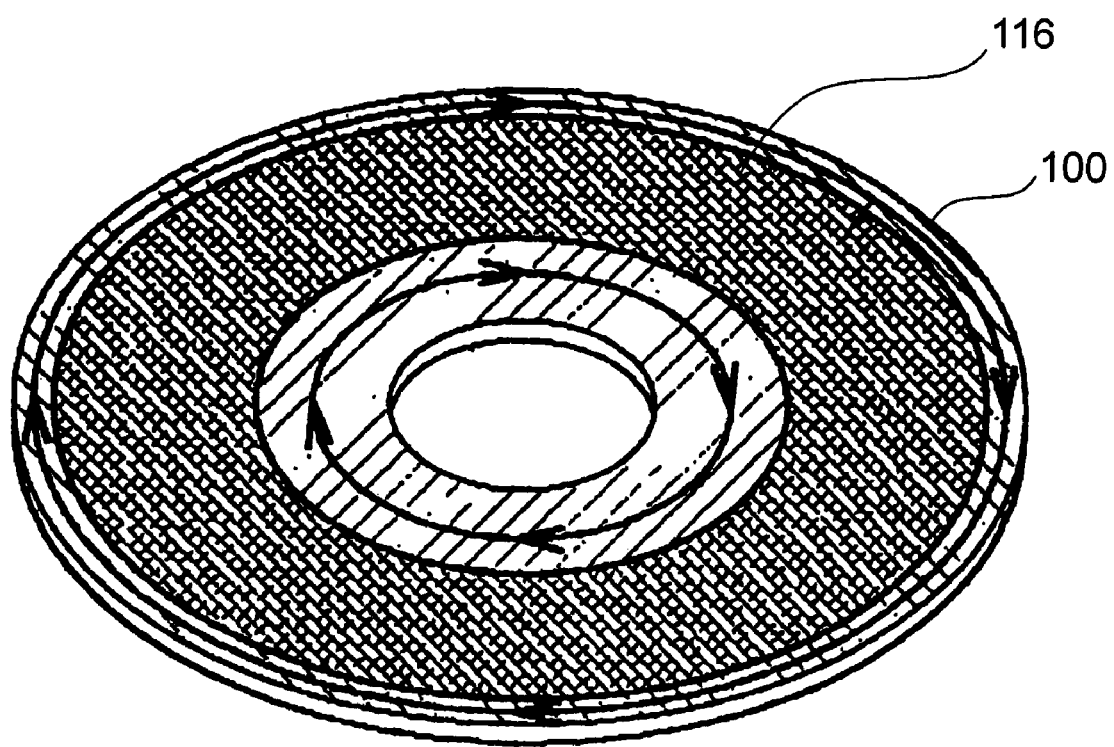
FIG. 8 is another view of the magnetic disc depicting a state wherein data signals corresponding to a shape of pattern of a magnetic part of a master disc is recorded in a predetermined area thereof.

At this time, a procedure for transferring and recording the data signals corresponding to the shape of pattern formed on the master disc 2 into the magnetic disc 100 will be described in more detail by referring to FIGS. 7 to 9.

First of all, the magnet 17 is rotated in parallel with the master disc 2 around the center axis of the master disc 2 as its rotary axis, with the magnet 17 brought in the position close to the master disc 2. This preliminarily magnetizes the magnetic disc 100 in one direction as shown by arrows in FIG. 7 (initial magnetization).

Then, the magnet 17 is rotated in a direction opposite to the arrow E in FIG. 3 after the master disc 2 and the magnetic disc 100 are made to contact evenly with the master disc 2 set in position and overlapped on the magnetic disc 100 as described above. In other words, an application of the magnetic field in the direction opposite to the initial magnetization magnetizes magnetic parts 26 on the master disc 2. It then records the data signals, which correspond to the shape of pattern of the magnetic parts 26 of the master disc 2, on predetermined areas 116, which also correspond to the magnetic parts 26 of the master disc 2, of the magnetic disc 100 overlapped with the master disc 2, as shown in FIG. 8. Arrows shown in FIG. 8 indicate a direction of the magnetic field of a magnetized pattern transferred and recorded into the magnetic disc 1 during this process.

Figure 9:
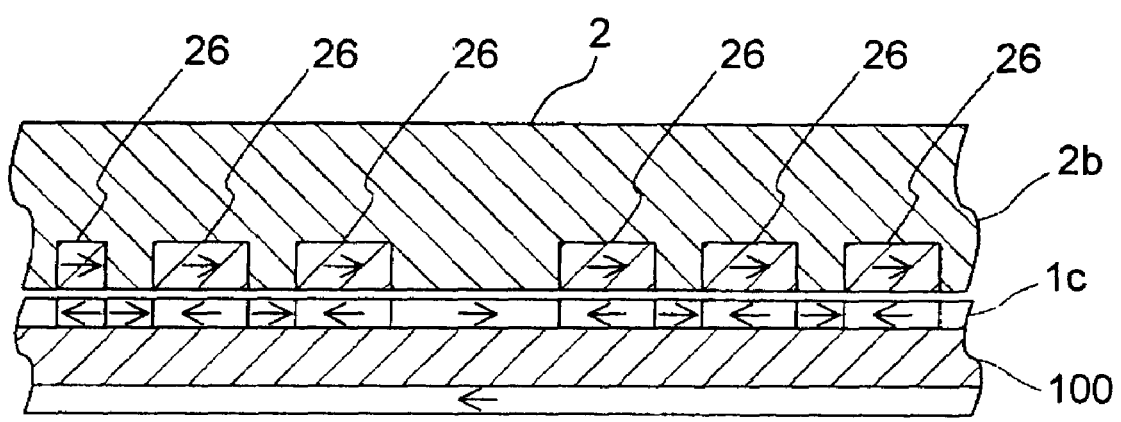
FIG. 9 is a drawing showing a process of magnetic transferring data signals corresponding to a shape of pattern formed on a master disc onto a magnetic disc.

FIG. 9 shows what is taking place in the process of magnetization, wherein the data signals can be recorded in a ferromagnetic layer 1c of the magnetic disc 100 by magnetizing the magnetic parts 26 with an application of the magnetic field from the outside to the master disc 2 while the master disc 2 is placed in close contact with the magnetic disc 1. That is, transferring and recording can be made magnetically into the magnetic disc 100 as a magnetized pattern corresponding to the data signals by using the master disc 2 composed of a nonmagnetic silicon substrate 2b and the magnetic parts 26 of ferromagnetic thin film formed thereon in the shape of a pattern arranged to correspond with predetermined data signals.

There are other methods of transferring and recording the pattern of the master disc 2 into the magnetic disc 1, besides the method of applying the external magnetic field to the master disc 2 positioned in contact with the magnetic disc 100 as described above. That is, the data signals can be recorded even with a method in which magnetic parts 26 of a master disc 2 is magnetized beforehand and this master disc 2 is made to contact closely together with a magnetic disc 1.

Figure 10:
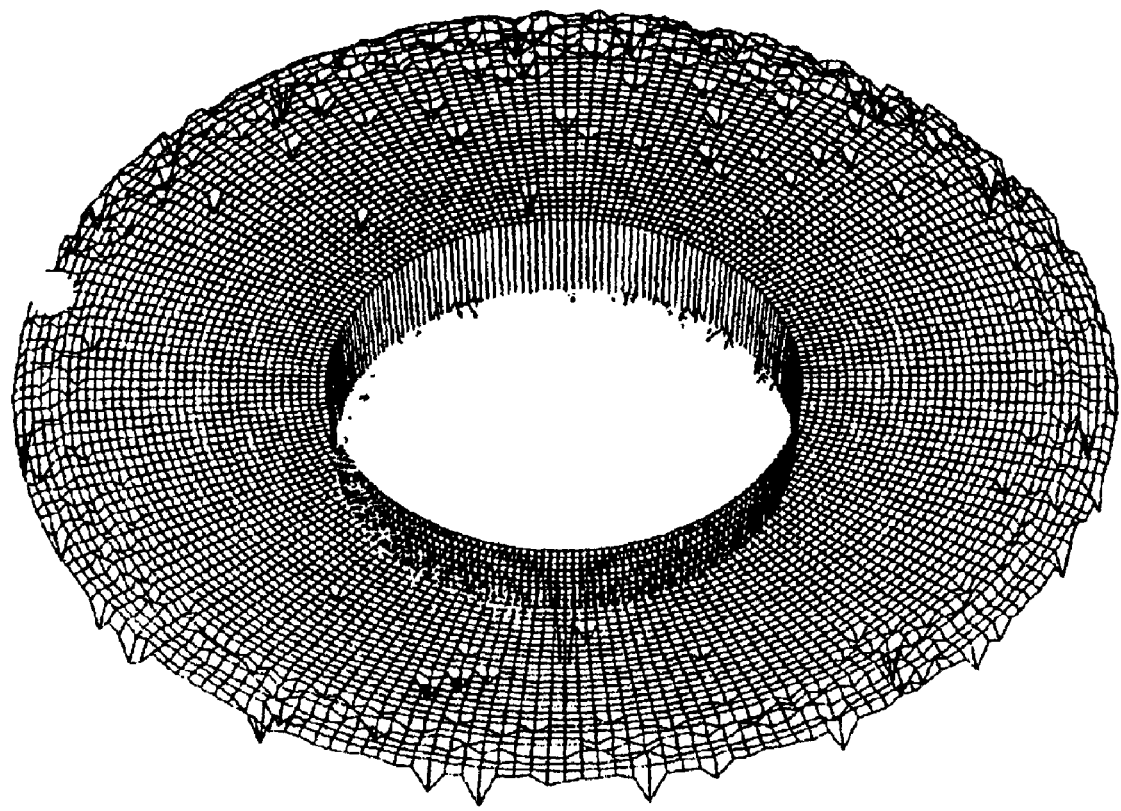
FIG. 10 is a graphical representation showing a data taken by a foreign object measuring apparatus on a surface of a magnetic disc whereon magnetic transfer is performed with the magnetic transfer apparatus of the first exemplary embodiment of the invention.
Figure 11:
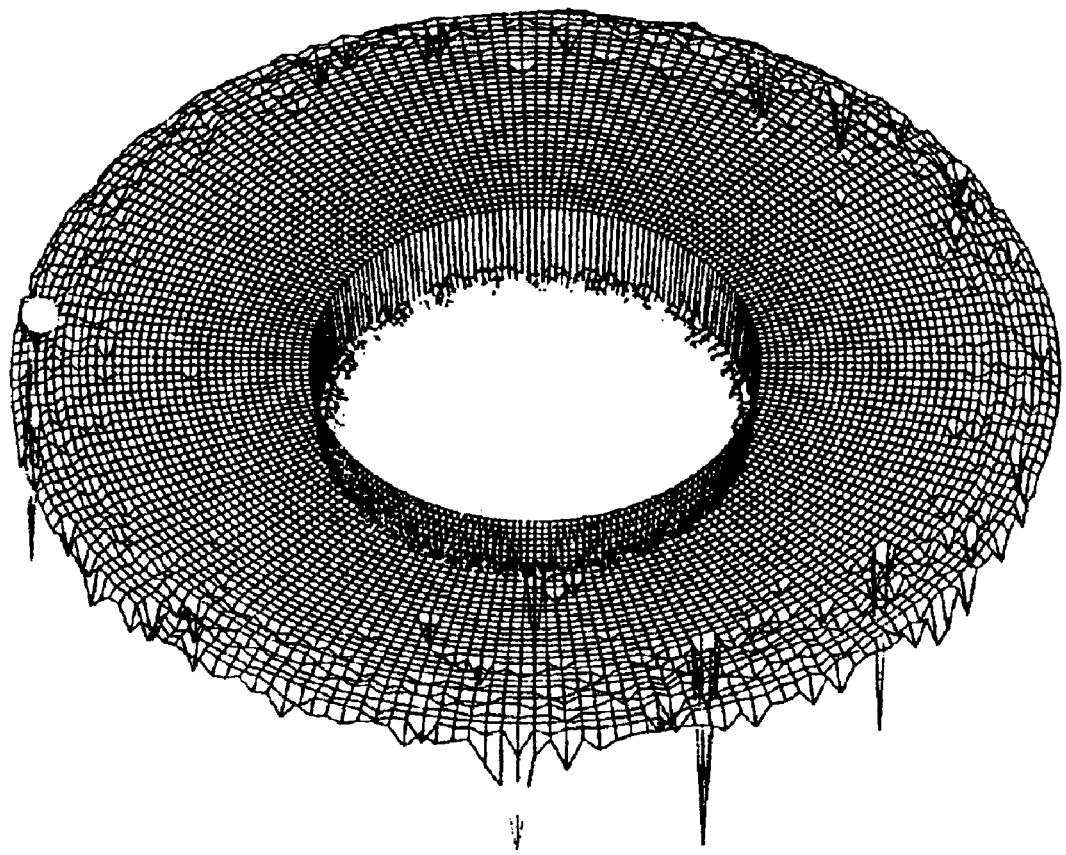
FIG. 11 is a graphical representation showing a data taken by the foreign object measuring apparatus on a surface of a magnetic disc whereon magnetic transfer is performed with a magnetic transfer apparatus of the prior art.

Condition of surfaces of the magnetic discs completed here, represented by a result of measurements taken by a particle measuring apparatus are shown in FIG. 10 and FIG. 11. FIG. 11 shows a condition of a magnetic disc surface on which transfer was made with the conventional transferring method, that is, no dummy disc was used for the above described operation of suctioning and forced feeding. Table 2 shows a relation between depth of defects and number of the defects produced by the conventional transferring method.

TABLE 1

| Depth of defects | 40 nm or deeper | 50 nm or deeper | 60 nm or deeper |
|---|---|---|---|
| Number of defects | 2 | 0 | 0 |

TABLE 2

| Depth of defects | 40 nm or deeper | 50 nm or deeper | 60 nm or deeper |
|---|---|---|---|
| Number of defects | 24 | 18 | 7 |

It is known from FIG. 11 and Table 2 that there are 24 defects having 40 nm or greater in depth in existence in the surface of the magnetic disc, and many of them in a peripheral area.

On the other hand, FIG. 10 represents a graphical figure showing a condition of a magnetic disc surface on which magnetic transfer was made with this regular magnetic disc replaced after the above described operation of suctioning and forced feeding was made 100,000 times using a dummy disc. Table 1 shows a relation between depth of defects and number of the defects in this case. It is known from Table 1 that there are 2 defects having depth equal to or greater than 40 nm in existence in the surface of the magnetic disc.

It is obvious from these figures that defects previously existed in the magnetic disc due to the anomalous bumps on the master disc 2 decrease substantially because the surface of the master disc 2 is smoothed by repeating the operation of suctioning and forced feeding using the dummy disc.

Figure 12:
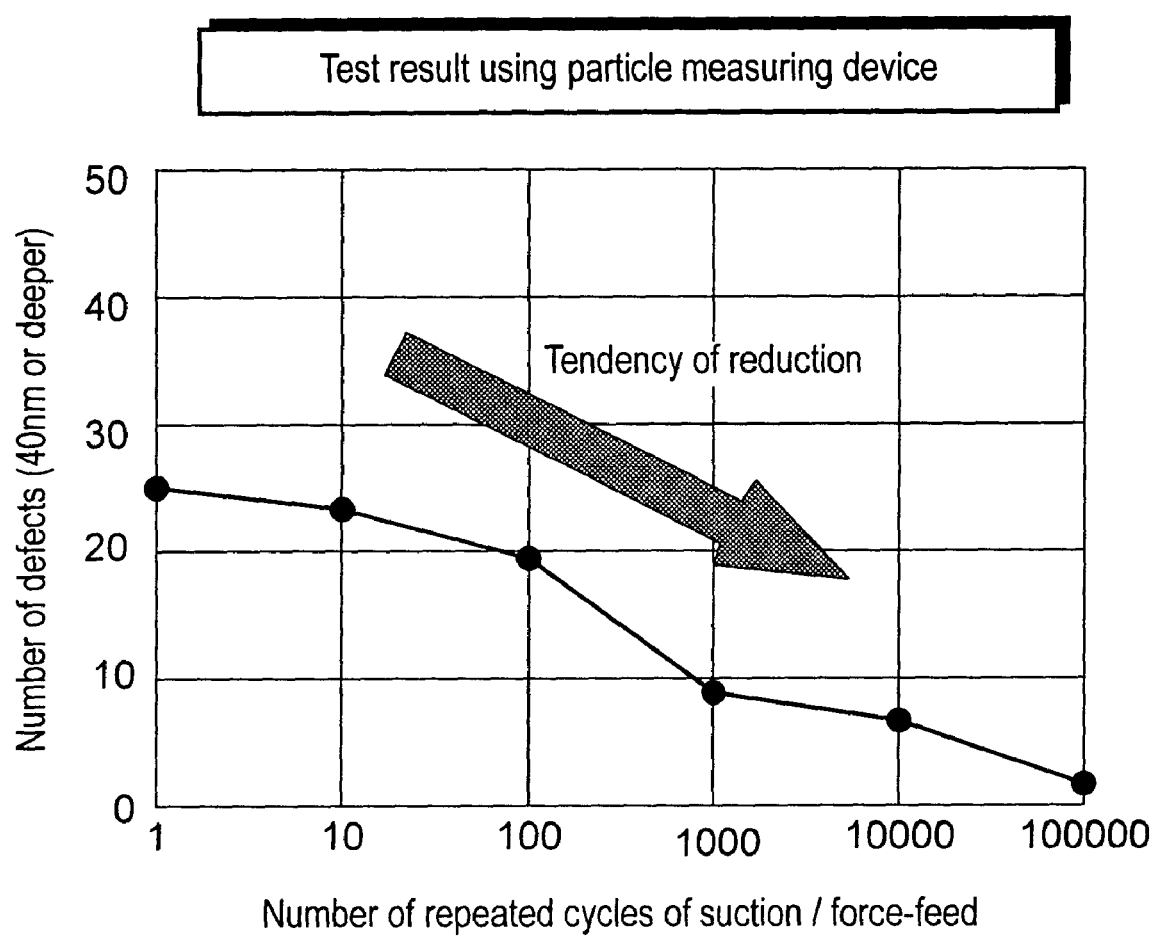
FIG. 12 is a graphical representation showing a relation between number of defects on a surface of a magnetic disc and number of repeated cycles of suctioning and pressurized feeding.

Here, a relation between number of suctioning and forced feeding operations and number of defects in depth of 40 nm or greater is graphically represented in FIG. 12. It is known from FIG. 10 that the number of defects decreases as the number of suctioning and forced feeding operations is increased.

In addition, FIGS. 13A through 13D show conditions of surfaces of the master disc 2 at an initial stage and after the suctioning and force-feeding is repeated.

Figure 13A:
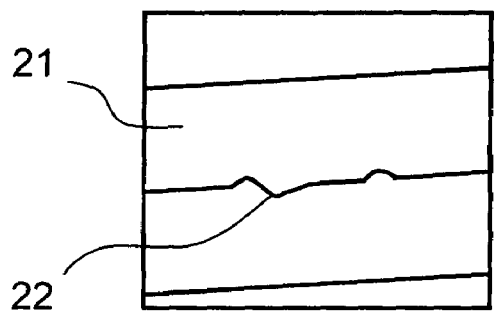
FIG. 13A is an illustration showing burrs produced in an initial stage in a edge portion of a track pattern formed on a master for magnetic transfer.
Figure 13B:
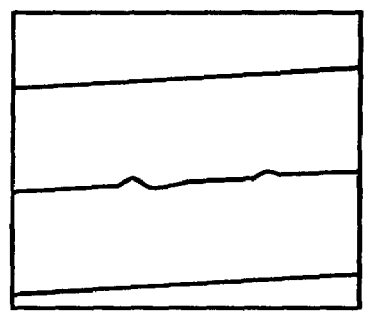
FIG. 13B is another illustration showing burrs produced in a stage after suctioning and forced feeding are repeated.

It is obvious that burrs 22 produced in the initial stage in a edge portion of a track pattern 21 formed on the master disc 2, as shown in FIG. 13A, are smoothed as shown in FIG. 13B after the 100,000 cycles of suctioning and forced feeding.

Figure 13C:
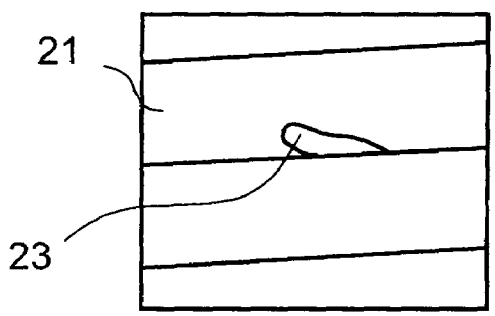
FIG. 13C is an illustration showing a bump formed in the initial stage on the master for magnetic transfer.
Figure 13D:
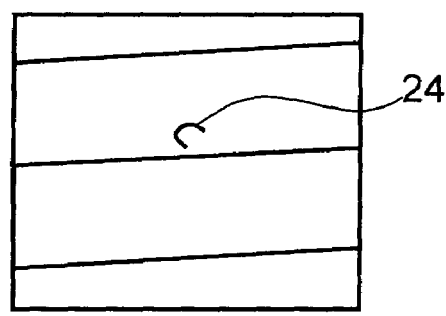
FIG. 13D is another illustration showing a bump formed in the stage after the suctioning and forced feeding are repeated.

It is also obvious that a bump 23 existed initially as shown in FIG. 13C is smoothed, and it has almost disappeared except for a tip 24 of the bump, of which a magnitude of projection was highest, as shown in FIG. 13D, after the 100,000 cycles of suctioning and forced feeding.

As has been described, the present exemplary embodiment makes it possible to manufacture magnetic discs of high quality having extremely smooth surfaces, and realizes accurate magnetic transfer, since it removes foreign particles that exist on the surface of the master disc 2 and smoothes anomalous bumps by executing the operation of suctioning and forced feeding using the dummy disc before the process of magnetic transfer.

With regard to the dummy disc, it is necessary to replace with a new dummy disc if stain or a number of foreign particles on the surface exceed predetermined levels.

Further, it is desirable that hardness of the surface of the dummy disc is lower than that of the surface of the master disc as stated in the present exemplary embodiment. This is because no dimple is produced on the surface of the dummy disc, if there is a foreign particle higher in hardness than that of the surface of the master disc but lower than that of the dummy disc in existence between the master disc 2 and the dummy disc 1, since the hardness of the surface of the dummy disc is higher than that of the foreign particle, when the hardness of the surface of the dummy disc is higher than that of the surface of the master disc. In other words, the foreign particle does not stick to the surface of the dummy disc. Therefore, the foreign particle stays stuck on the surface of the master disc. This can be a cause of a defect, as the foreign particle produces a dimple in a surface of the dummy disc, when the dummy disc 1 and the master disc 2 get in close contact with each other afterward, since the hardness of the foreign particle is higher than that of the surface of the dummy disc.

Contrary to the above, it is possible to securely avoid dimples from being produced in the dummy disc, at a time of close contact of the dummy disc 1 and the master disc 2, by decreasing the hardness of the surface of the dummy disc to be lower than that of the surface of the dummy disc, for the reason as described above.

Furthermore, although aluminum is selected as material of the dummy disc in the present exemplary embodiment, this is not restrictive. A disc made of aluminum with a plated layer formed thereon may be used as a dummy disc. It is preferable to use a material having ferromagnetic property such as Co—Re—P, Co—Ni—P, and Co—Ni—Re—P for the plated layer. Formation of the plated layer having a magnetic property on the surface of the dummy disc provides the following effect. That is, although the magnetic film peels off the master disc 2 by the repeated operation of close contact and separation with the dummy disc 1 if an anomalous bump exists on the magnetic film covering the surface of the master discdisc 2, a peeled piece of the magnetic film sticks to the dummy disc side, since the plated layer having magnetic property is formed on the surface of the dummy disc 1.

Moreover, although a varnishing process is not executed in the present exemplary embodiment, the varnishing process may be added using a tape, a head, buffing abrasives, and the like, for instance, and polishing powder or grinding powder left on a surface of the magnetic disc after the varnishing process can be removed thereafter by carrying out the process of suctioning and forced feeding described above. In this case, the pressure of suctioning may be set relatively higher to about 60 kPa, for instance, while the pressure for forced feeding is left unchanged in FIG. 6, in order to improve an effect of the removal.

The master disc 2 shown in FIG. 4 is described in detail at this time.

Figure 14:
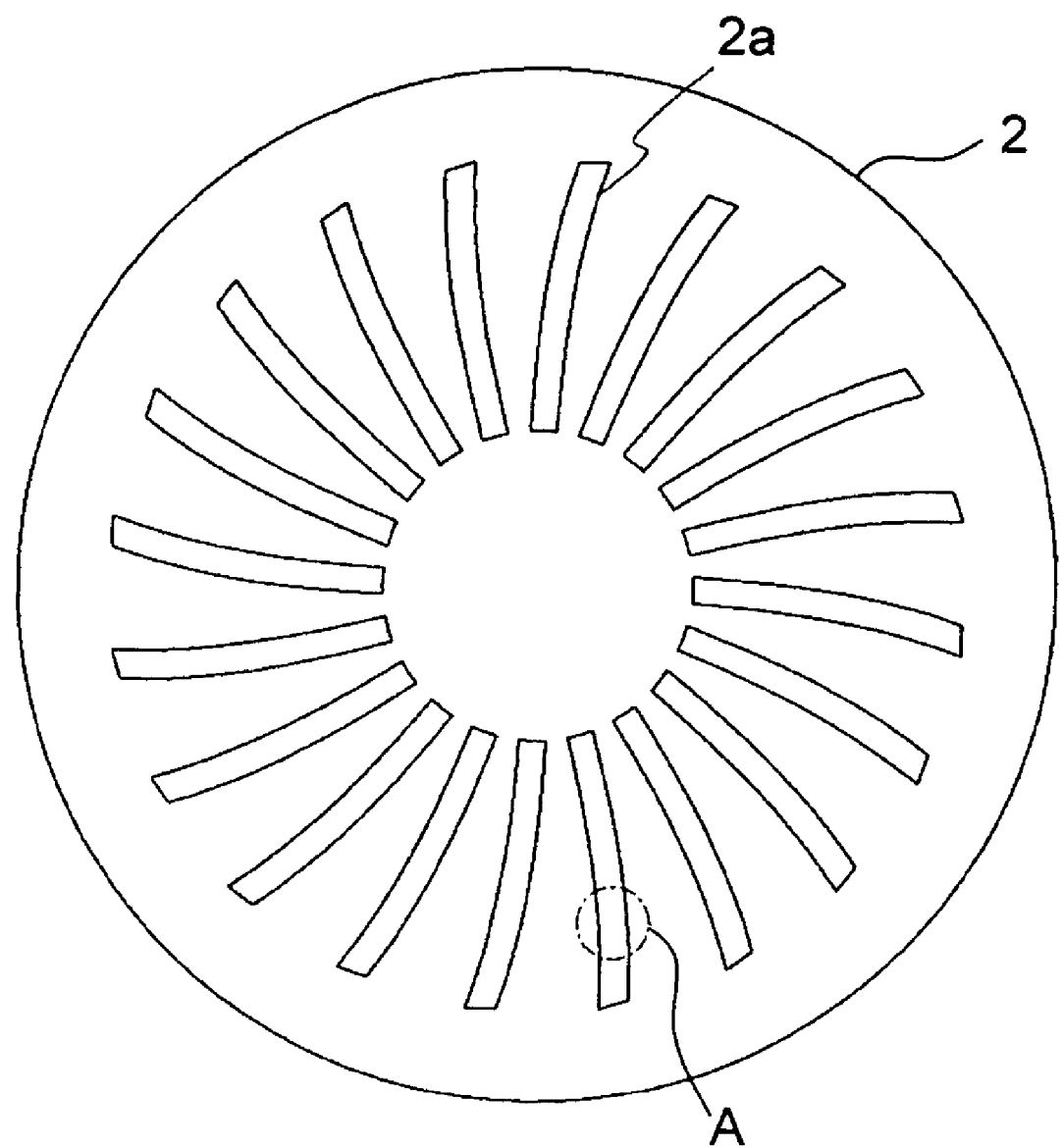
FIG. 14 is a schematic illustration showing an example of a signal area on a master for magnetic transfer in the first exemplary embodiment of the invention.

FIG. 14 schematically illustrates a surface of an example of the master disc 2 for magnetic transfer. As shown in FIG. 14, there is a signal area 2a formed generally radially on one of main surfaces of the master disc 2, i.e. the contact surface 3 at a side which gets in contact with a surface of the ferromagnetic thin film on the magnetic disc 1. As FIG. 4 and FIG. 14 are schematic illustrations, the signal area 2a in FIG. 14 is composed actually on the contact surface 3 excluding the grooves 4 in FIG. 4.

Figure 15:
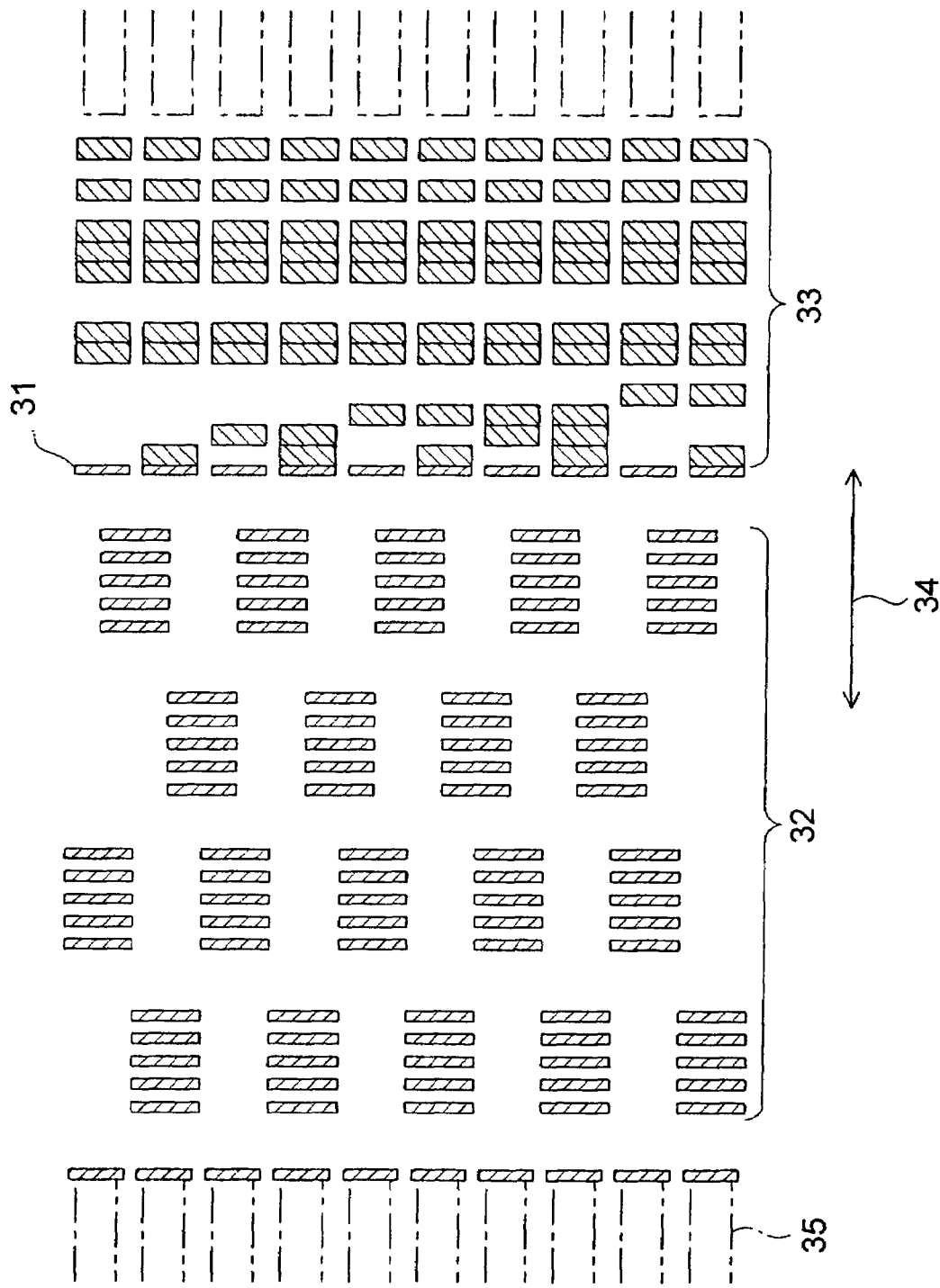
FIG. 15 is an enlarged schematic illustration showing a portion of the signal area on a master for magnetic transfer in the first exemplary embodiment of the invention.

An enlarged view of a portion A circled with a dotted line in FIG. 14 is shown schematically in FIG. 15. As shown in FIG. 15, there are formed digital data signals to be recorded on magnetic disc in the signal area 2a. For instance, a master disc data pattern in a shape of pattern corresponding to the data signals described above is formed with magnetic parts composed of ferromagnetic thin film in a position corresponding to pre-format recording. In FIG. 15, portions with hatching are the magnetic parts composed of a ferromagnetic thin film. The master disc data pattern shown in FIG. 15 includes areas for each of clock signal 31, tracking servo signal 32, address data signal 33, and so on arranged one after another in a direction of a track length with respect to a track length direction 34 of the disc. Data signal areas 35 are also shown. The master disc data pattern shown in FIG. 15 is one of examples, and a construction, an arrangement, and the like of the master disc data pattern are determined appropriately according to digital data signals to be recorded in the magnetic recording media.

In the case of a hard disc drive, wherein reference signals are first recorded on a magnetic film of a hard disc, and pre-format recording of tracking servo signals, etc. is made thereafter according to the reference signals, for instance, only the reference signals for the pre-format recording are transferred in advance on the magnetic film of the hard disc using the master disc of this invention, and the hard disc is built into an enclosure of the drive, so that pre-format recording of the tracking servo signals, etc. may be made using a magnetic head in the hard disc drive.

Figure 16:
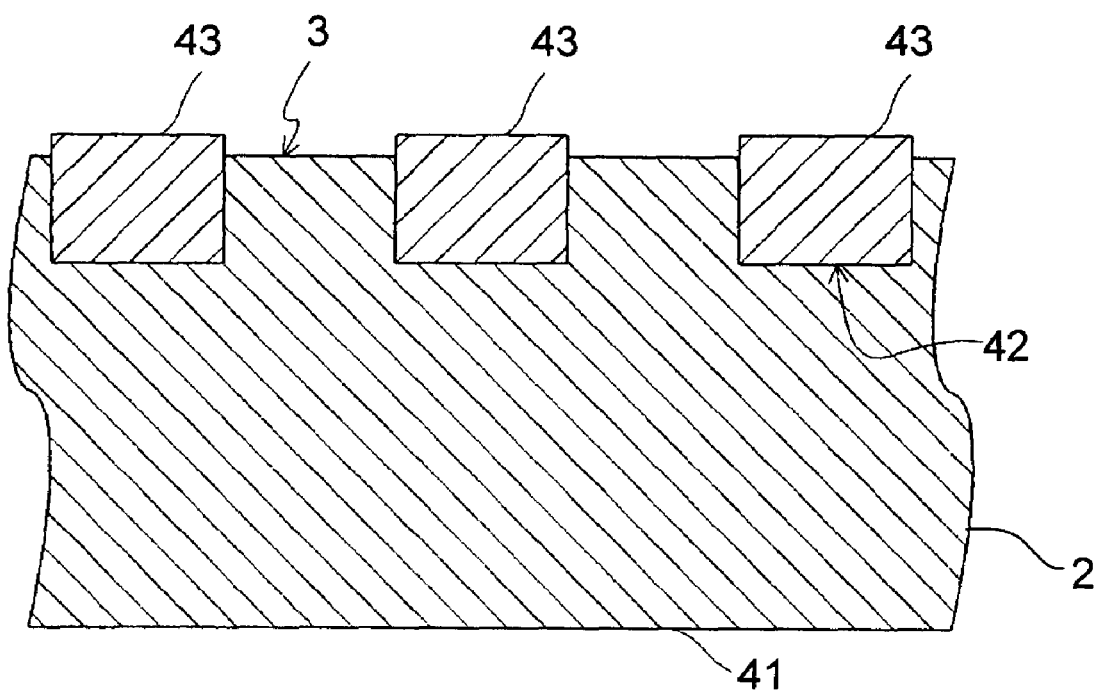
FIG. 16 is a sectional schematic illustration showing a portion of the signal area of a master for magnetic transfer in the first exemplary embodiment of the invention.

A sectional view of a part of the area shown in FIG. 14 and FIG. 15 is depicted in FIG. 16.

As shown in FIG. 16, the master disc 2 includes a disc-like substrate 41 composed of nonmagnetic material such as a silicon substrate, a glass substrate, a plastic substrate, and the like, of which one of main surfaces, i.e. a contact surface 3 at a side whereto a surface of the magnetic disc 1 comes in contact, is formed with recesses 42 in a shape of a plurality of fine layout pattern corresponding to the data signals, and ferromagnetic thin films 43, each defining the magnetic part, inlaid in the recesses 42 of the substrate 41.

Many kinds of magnetic material can be used as the ferromagnetic thin film 43 for example hard magnetic material, semi-hard magnetic material or soft magnetic material. Any material is adoptable so long as it can transfer and record digital data signals into a magnetic recording medium. Iron, cobalt, iron-cobalt alloy and so on, for instance, can be used. The larger the saturation magnetic flux density of the magnetic material, the better for generating an enough level of recording magnetic field without depending on kind of the magnetic recording medium in which master disc data is recorded. In particular, there are occasionally cases in that a satisfactory recording can not be made into a magnetic disc of a high coercive force exceeding 2000 Oersteds and a flexible disc having a magnetic layer of large thickness, if the saturation magnetic flux density becomes 0.8 Tesla or less. In general, magnetic materials having a saturation magnetic flux density of 0.8 Tesla or greater, and preferably 1.0 Tesla or greater, are used.

In addition, a thickness of the ferromagnetic thin film 43 depends on a bit length, saturation magnetization of the magnetic recording medium and a film thickness of the magnetic layer. But, the thickness of 50 nm to 500 nm may be appropriate in the case of, for instance, approximately 1 $\mu$m in bit length, approximately 500 emu/cc in saturation magnetization of the magnetic recording medium, and approximately 20 nm in thickness of the magnetic layer of the magnetic recording medium.

In a method of recording such as the above, it is desirable to make a uniform magnetization, based on a shape of their layout pattern of a soft magnetic thin film or a semi-hard magnetic thin film as the ferromagnetic thin film provided on the master disc, by exciting them during a pre-format recording in order to obtain recording signals of excellent quality. It is also preferable to uniformly DC erase the magnetic recording medium such as a hard disc prior to recording the signals using the master disc.

Next, a method of manufacturing the master disc will be described.

The master disc for use in a recording method of the present invention is prepared by a method including the steps of: forming a resist film on a surface of a silicon substrate; patterning the resist film by exposing and developing it with the lithography technique using laser beam or electron beam such as used in the photolithographic method; followed by forming fine recesses and ridges corresponding to data signals by etching it with dry etching, etc.; then forming a ferromagnetic thin film including cobalt or the like thereafter by sputtering, vacuum deposition, ion plating, CVD, plating, and the like method; and removing the resist film by a so-called lift-off method. This produces the master disc provided with magnetic parts corresponding to the data signal in a form of ferromagnetic thin film inlaid in the recesses.

Method of forming the recesses and ridges on the surface of the master disc is not limited to the method described above. The fine recesses and ridges can be formed directly on it using laser, electron beam, ion beam, or by machining.

What has been described in this exemplary embodiment is an example of using a feed pump for sucking air, but nitrogen or other kind of gas may be supplied from a high-pressure gas cylinder.

Second Exemplary Embodiment

A method of magnetic transfer of a second exemplary embodiment of the present invention will now be described by referring to FIG. 17.

Figure 17:
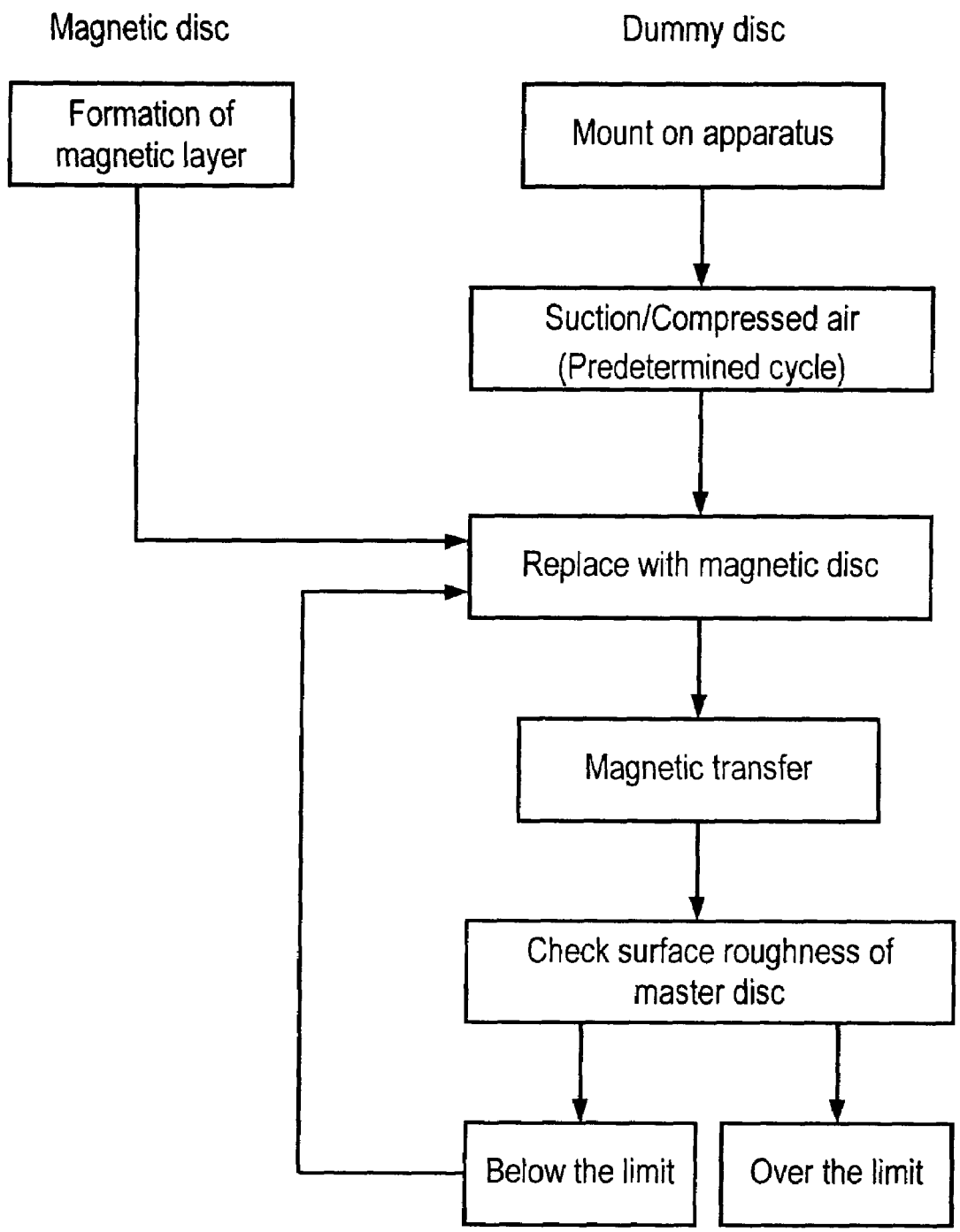
FIG. 17 is a flow chart showing a process in a magnetic transfer method of a second exemplary embodiment of the present invention.

A flow chart of processes of this exemplary embodiment is shown in FIG. 17. Each of the processes is same as that of the first exemplary embodiment. Different points of this exemplary embodiment are that a surface roughness of a master disc for magnetic transfer is measured and the result of measurement is fed back after magnetic transfer is performed to a regular magnetic disc.

That is, foreign particles that exist on the master disc are measured using a particle counter or the like, which uses a backscattered light detection method, in FIG. 17 after the magnetic transfer is made to the magnetic disc. The magnetic transfer is continued by installing a new magnetic disc, if foreign particle is not observed in this step.

However, an operation of suctioning and forced feeding is repeated by installing a dummy disc when a number of foreign particles becomes a predetermined value, i.e. three or more in the case of this exemplary embodiment, since there will be a problem of head crash as described previously if the number of foreign particles on the surface of the master disc increases and it reaches a certain number or more while repeating the magnetic transfer. This improves the surface by executing the process of suctioning and forced feeding on the master disc 2 of which a surface is deteriorated, thereby magnetic discs having smooth surfaces can be manufactured again.

In other words, this exemplary embodiment realizes production of magnetic discs having smooth surfaces continuously by maintaining regularly the surface of the master disc 2 during the process of magnetic transfer.

The inspection of foreign particles on the master disc 2 is not necessarily required after the magnetic transfer of every single magnetic disc. The measurement of the surface roughness of the master disc may be made every after execution of a predetermined number of the magnetic transfers. Or, it may be made after execution of the magnetic transfer processes in number of times slightly shorter than a number, as this number is stored as needed in a form of data signifying that foreign particles on the master disc are expected to exceed a predetermined value after so many times of the magnetic transfers are executed.

A similar result can also be attained even if foreign particles are not necessarily measured, if the master disc is maintained by installing a dummy disc whenever a predetermined number of magnetic discs are processed for the magnetic transfer, because the measurement of foreign particles on the master disc takes a certain amount of time.

Moreover, a similar effect can be achieved by adopting another method in that an inspection is carried out on a disc after the magnetic transfer, and a process of suctioning and forced feeding made on the master disc 2, if a number of foreign particles found on the disc after the magnetic transfer exceeds a predetermined value.

The above also applies similarly to the dummy disc 1, that foreign particles on the master disc 2 can be detected by measuring a surface of the dummy disc 1 during the suctioning and forced feeding of the master disc 2 with respect to the dummy disc 1.

In other words, the foreign particles, if present between the master disc and the dummy disc, lodge in the dummy disc 1 side during the suctioning, and dimples are produced on the surface of the dummy disc 1, since the dummy disc 1 made of aluminum is lower in hardness than the master disc 2 made of silicon.

Accordingly, magnetic discs of high quality can be manufactured with the master disc in a state of smooth surface free from foreign particles, if the magnetic transfer is made by detecting small dimples on the surface of the dummy disc 1 every after a predetermined number of times the suctioning and forced feeding are performed, and making the magnetic transfer after replacing the dummy disc 1 with a magnetic disc when such dimples become not detectable.

In this regard, it is desirable for the surface of the dummy disc to be strong in adhesion in view of its adhesiveness to foreign particles.

In other words, there is a chance that foreign particles, if present between the master disc and the dummy disc, adhere to the master disc side since they do not adhere to the surface of the dummy disc if the adhesiveness is weak. Moreover, it is possible to make an erroneous judgement, when making a determination for presence or absence of foreign particles from a condition of the surface of the dummy disc, since it has a smooth surface free from the foreign particles.

On the other hand, the foreign particles on the master disc can be removed efficiently if the adhesiveness is strong, since the foreign particles between the master disc and the dummy disc adhere to the dummy disc side. Presence and absence of foreign particles can also be precisely judged from a condition of the surface of the dummy disc.

Accordingly, it is desirable for the dummy disc to be strong in adhesion to foreign particles, in addition to be low in hardness as compared to the master disc. In a word, it is desirable for the dummy disc not coated with lubricant.

Figure 18:
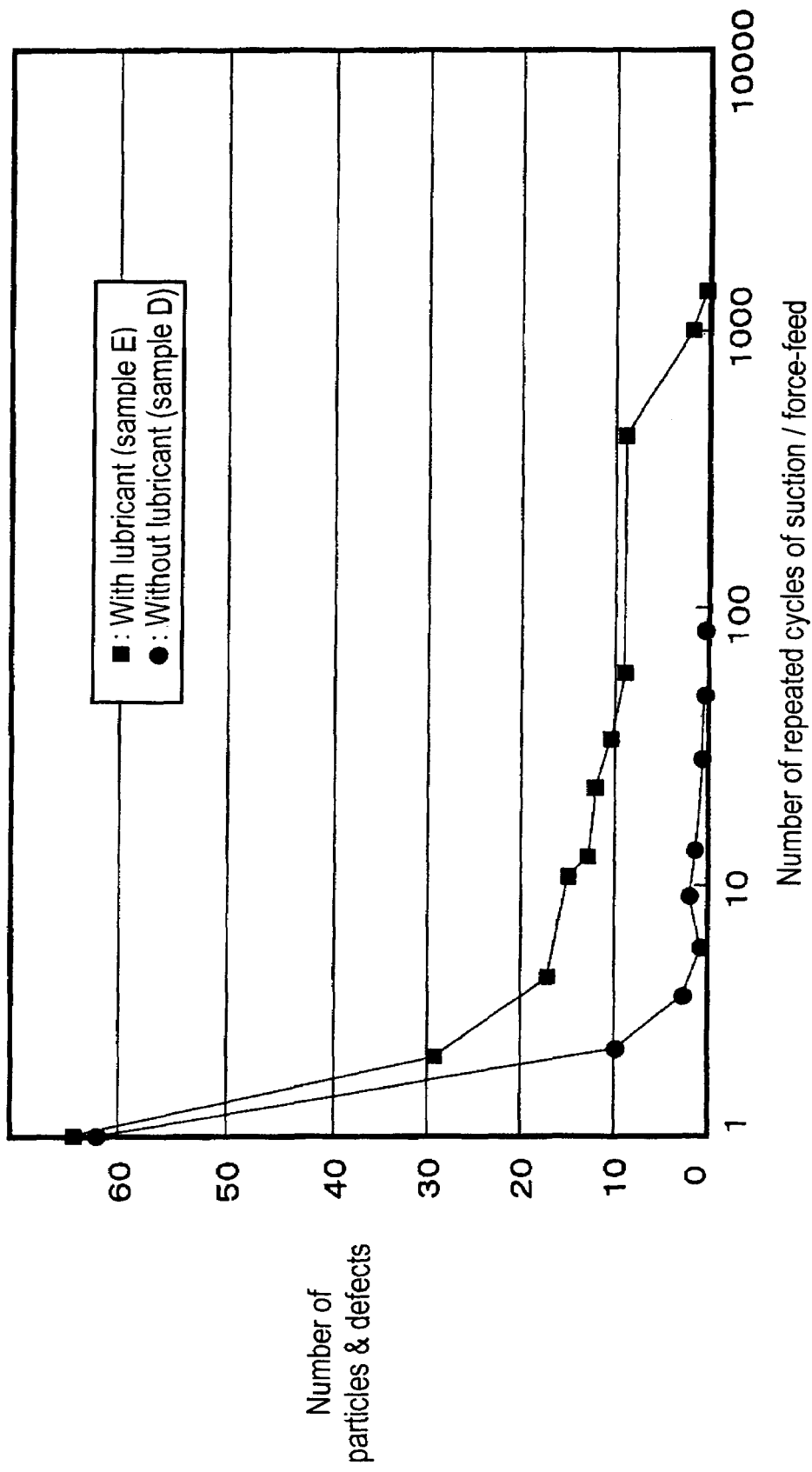
FIG. 18 is a graphical representation showing relations between number of foreign particles and defects on a surface of a master disc for magnetic transfer and number of suctioning/forced feeding in case of with and without lubricant on a dummy disc.

FIG. 18 shows a relationship between a number of foreign particles and defects in a master disc and suctioning/forced feeding, in the cases of using a dummy disc coated with lubricant and a dummy disc not coated with lubricant.

In FIG. 18, circular dots represent the dummy disc not coated with lubricant (sample D), and square dots represent the dummy disc coated with the lubricant on a surface thereof (sample E).

It is obvious, when the sample D and the sample E are compared in FIG. 12, that the particles on the master disc-disc can be removed efficiently to nearly zero by repeating close contact and separation between the master disc and the dummy disc for several times, in the case of the sample D, although the numbers of foreign particles and defects on the master discs are same at the initial stage. To the contrary, it is clear in the case of the sample E that the number of foreign particles and defects does not decrease substantially after the 100 cycles of close contact and separation.

Figure 19A:
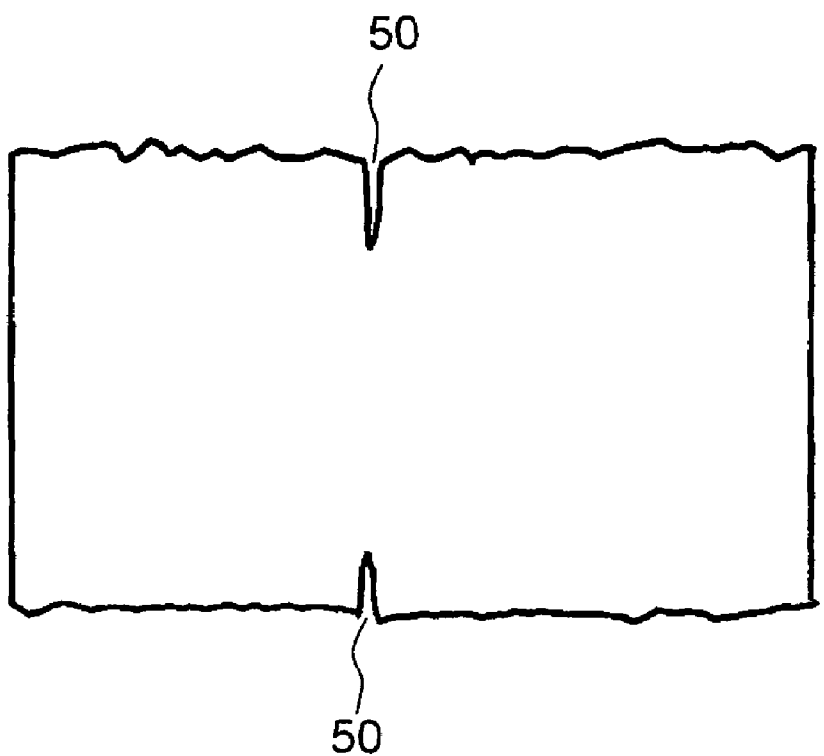
FIG. 19A is an illustration depicting a reproduced signal envelope of a signal recorded on a magnetic disc after magnetic transfer is performed by using a dummy disc coated with lubricant.
Figure 19B:
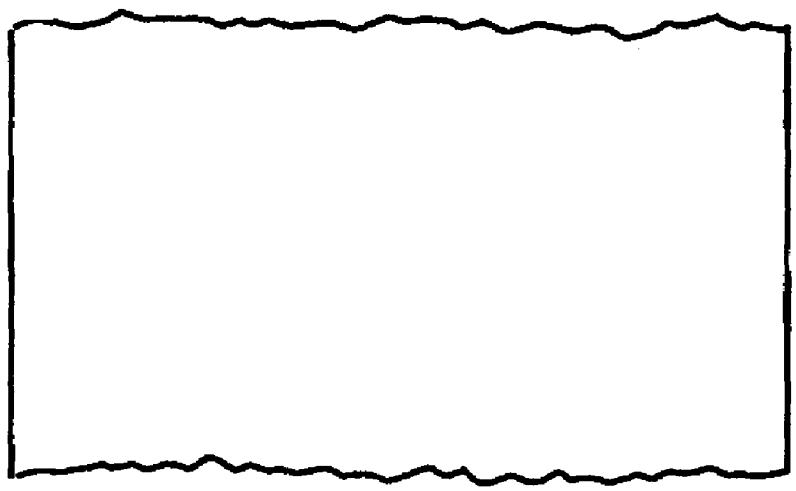
FIG. 19B is another illustration depicting a reproduced signal envelope of a signal recorded on a magnetic disc after magnetic transfer is performed by using a dummy disc not coated with lubricant.

In addition, FIGS. 19A and 19B schematically illustrate envelopes of reproduced signals, when the signals are recorded first in magnetic discs after magnetic transfer, and the signals are reproduced thereafter.

FIG. 19A shows the envelope taken from the magnetic disc, on which magnetic transfer is performed from a master disc after repeating suctioning and forced feeding 1000 times on it using a dummy disc coated with lubricant. FIG. 19B shows the envelope taken from the magnetic disc, on which magnetic transfer is made from a master disc after repeating suctioning and forced feeding 1000 times on it using a dummy disc not coated with lubricant.

As shown in FIG. 19A, there is observed portions marked 50 where signal output is reduced in a center portion of the envelope, whereas no reduced portion is seen in the signal of FIG. 19B.

In respect of the fact with FIG. 19A, it is conceivable that the signal has not been recorded properly due to a spacing loss that has occurred during the magnetic transfer from the master disc, as a foreign particle has remained on the master disc even if defect has not been observed on the surface of the magnetic disc.

To the contrary, it is considered that no spacing loss has occurred in the signal of FIG. 19B as foreign particles on the master disc have been removed completely and the magnetic transfer was performed normally to the magnetic disc, since the suctioning and forced feeding have been processed on the master disc with the dummy disc not coated with lubricant.

Third Exemplary Embodiment

A method of magnetic transfer of a third exemplary embodiment of the present invention will be described next by referring to FIG. 20A to FIG. 21.

This exemplary embodiment differs from those of the first and the second exemplary embodiments in a respect that an area of close contact on a master disc for magnetic transfer during suctioning and forced feeding between the master disc and a dummy disc completely includes an area of the magnetic transfer when the magnetic transfer is made on a regular magnetic disc.

Figure 20A:
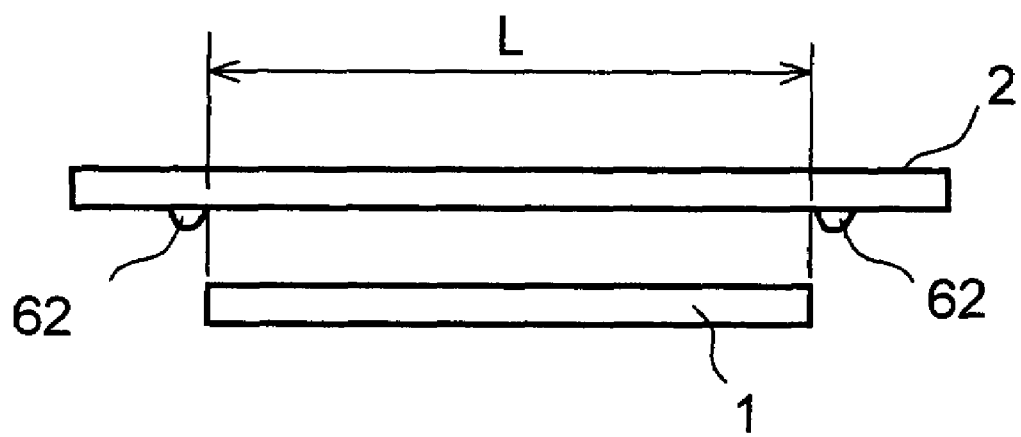
FIG. 20A is an illustration schematically depicting a relation between a master disc for magnetic transfer and a dummy disc during suctioning and forced feeding in a third exemplary embodiment of the present invention, wherein the former is made larger in size than the latter.
Figure 20B:
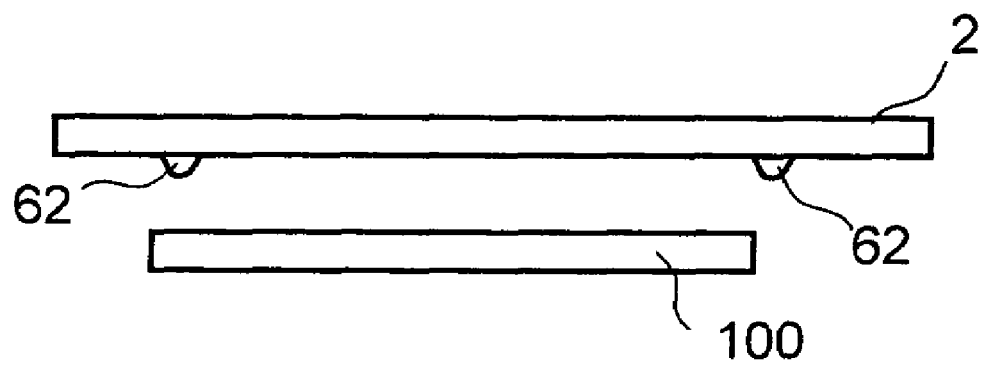
FIG. 20B is another illustration schematically depicting a relation between the master disc for magnetic transfer and a magnetic disc during the suctioning and forced feeding, when positioning of the latter is shifted from where the dummy disc had been installed, in the third exemplary embodiment of this invention.
Figure 21:
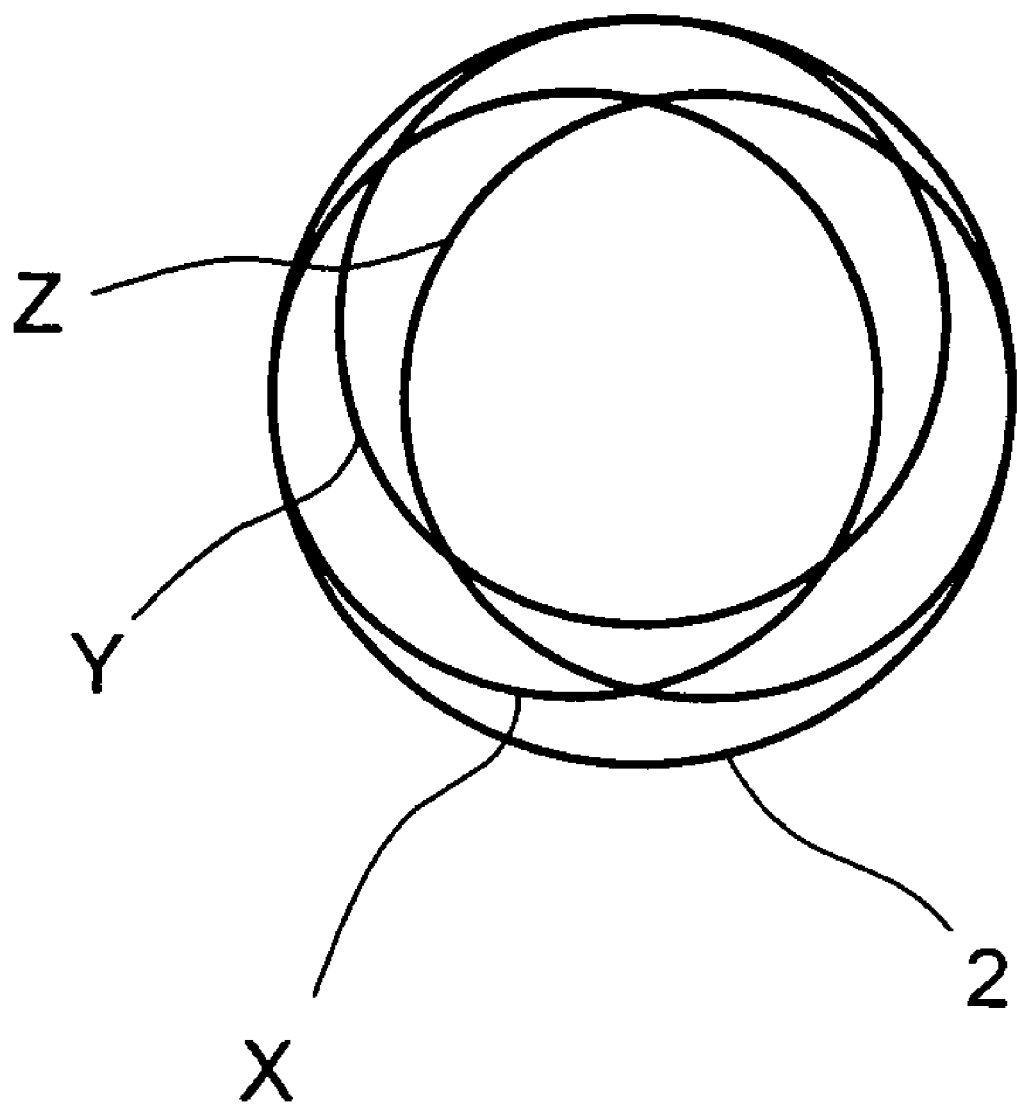
FIG. 21 is an illustration showing an example of positions on the master disc for magnetic transfer of a larger size whereto the dummy disc is closely contacted in the third exemplary embodiment of this invention.

FIGS. 20A and 20B are illustrations schematically depicting relations between the master disc 2 and the dummy disc 1 during the suctioning and forced feeding. In FIG. 20A, foreign particles 62 in an area A are removed by the suctioning and forced feeding between the master disc 2 and the dummy disc 1.

In the next step, when magnetic transfer is made after replacing the dummy disc 1 with a magnetic disc 100, there is a case that an edge of the magnetic disc 100 occasionally comes in contact with foreign particles 62 as shown in FIG. 20B due to a shift in position of installation of the magnetic disc 100, if the dummy disc 1 and the magnetic disc 100 are of the same size.

If this occurs, an output of servo signals transferred to the magnetic disc 100 decreases because of a spacing loss caused by a reduction in degree of contact between the magnetic disc 100 and the master disc 2 in vicinity of the foreign particles 62.

This subsequently results in a reading error, and thereby causing a disorder in rotation of the magnetic disc 100.

For this reason, a dummy disc 1 having a size greater than the magnetic disc 100 is adopted in this exemplary embodiment in order to increase the area L shown in FIG. 20A. Accordingly, this embodiment allows a normal magnetic transfer over an entire surface of the magnetic disc 100, and realizes manufacture of the magnetic disc 100 of high quality without causing a reduction in output of the servo signal even if a shift occurs in position of the installation of the magnetic disc 100 with respect to the dummy disc 1.

There are often cases of using a magnetic disc 100 taken normally in a mid-stage of manufacturing process as a dummy disc 1. Since they are both equal in size, the dummy disc 1 may intentionally be decentered during the suctioning and forced feeding between the dummy disc 1 and the master disc 2 in order to achieve the effect described above. In other words, the suctioning and forced feeding can be made over an area that cover the magnetic disc 100 completely, when a contacting position of the dummy disc 1 is shifted successively from X, Y, Z, . . . with respect to the master disc 2 each time the suctioning and forced feeding is made, as shown in FIG. 21.

Fourth Exemplary Embodiment

A method of magnetic transfer of a fourth exemplary embodiment of the present invention will be described next by referring to FIGS. 22 to 24.

This exemplary embodiment differs from those of the first through the third exemplary embodiments in respects that magnetic discs are greater in hardness than a master disc 2 made of silicon, because glass having hardness higher than silicon is used as a material of them, and that a dummy master disc is adopted.

Figure 22:
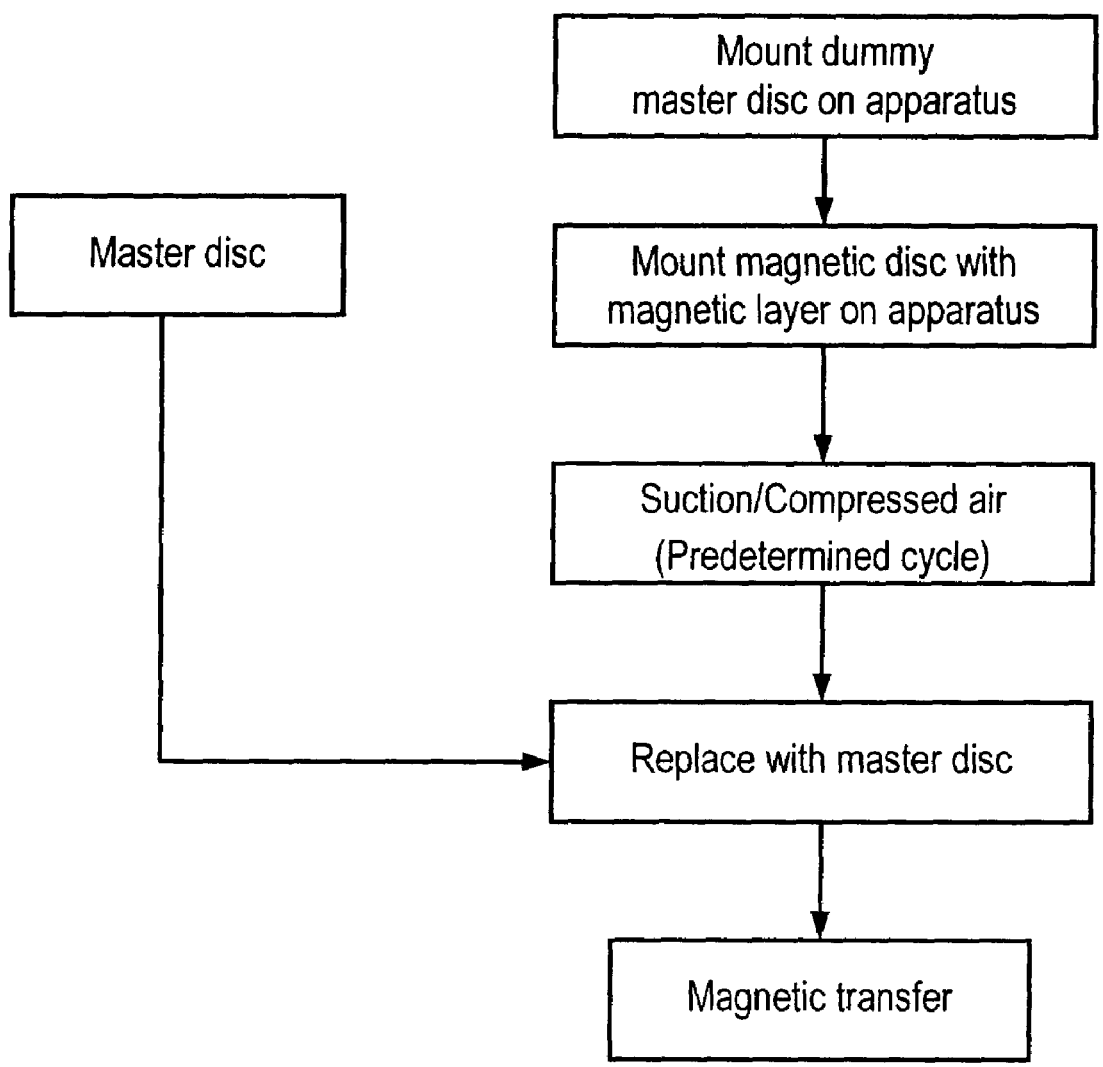
FIG. 22 is a flow chart showing a process in a magnetic transfer apparatus of a fourth exemplary embodiment of the present invention.

FIG. 22 shows a flow chart for processes of this exemplary embodiment. Each of the processes is similar to that of the first exemplary embodiment.

First, a dummy master disc made of silicon is installed in an apparatus, and a regular magnetic disc having a magnetic layer formed thereon is installed in the apparatus, in FIG. 22.

Then, a process of suctioning and forced feeding is repeated between the dummy master disc and the magnetic disc in the like manner as the first exemplary embodiment, and a magnetic transfer is carried out after the dummy master disc is replaced with a regular master disc.

In this process, the magnetic disc does not receive any defect even though a defect occurs on the dummy master disc side due to foreign particles caught between the dummy master disc and the magnetic disc when they make a close contact with each other, since material of the magnetic disc is glass having hardness greater than silicon. On the other hand, fine foreign particles present on a surface of the magnetic disc are removed by the dummy master disc.

Figure 23:
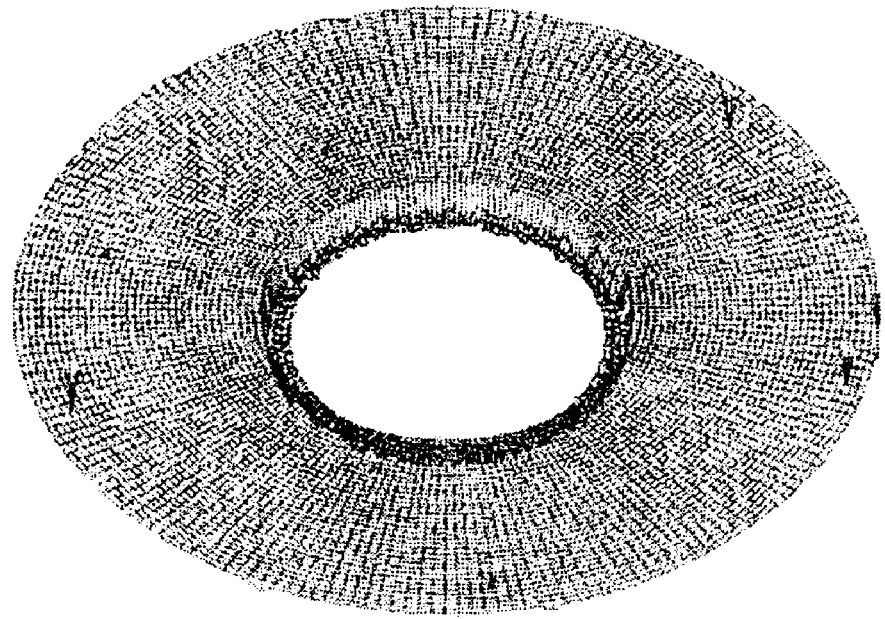
FIG. 23 is a graphical representation showing a surface of a master disc for magnetic transfer in a state after a process of suctioning and pressurized feeding is made in the fourth exemplary embodiment of this invention.
Figure 24:
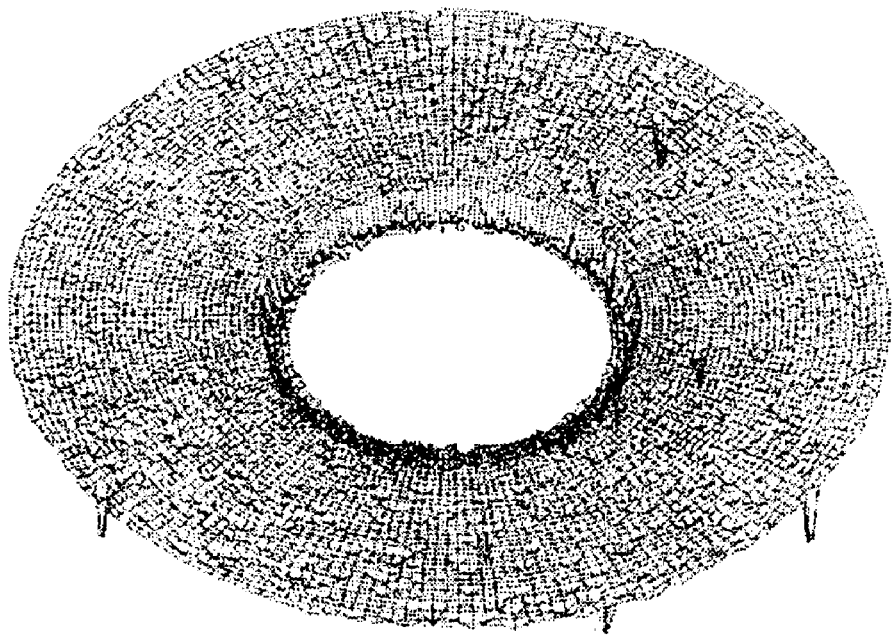
FIG. 24 is another graphical representation showing a surface of the master disc for magnetic transfer in a state when the process of suctioning and pressurized feeding in the fourth exemplary embodiment of this invention is not made.

A result of observation on the surface of the magnetic disc in this exemplary embodiment is shown in FIGS. 23 and 24. FIG. 24 shows a condition of the surface of the magnetic disc in an initial stage before the suctioning and forced feeding are made. Table 4 shows a relation between depth of defects and number of the defects in this case. It is known from Table 4 that there are 6 defects having 30 nm or more in depth, and uncountable number of smaller defects in existence in the magnetic disc.

TABLE 3

| Depth of defects | 20 nm or deeper | 30 nm or deeper | 40 nm or deeper | 50 nm or deeper | 60 nm or deeper |
|---|---|---|---|---|---|
| Number of defects | 3 | 0 | 0 | 0 | 0 |

TABLE 4

| Depth of defects | 20 nm or deeper | 30 nm or deeper | 40 nm or deeper | 50 nm or deeper | 60 nm or deeper |
|---|---|---|---|---|---|
| Number of defects | 9 | 6 | 2 | 2 | 1 |

FIG. 23 shows a condition of the surface of the magnetic disc when magnetic transfer is executed using the master disk after one cycle of suctioning and forced feeding with the dummy disc is made. Table 3 shows a relation between depth of defects and number of the defects in this case. It is known from Table 3 that no defect in depth equal to or deeper than 30 nm is found, and practically none of the smaller defects exists, but only an extremely smooth surface.

In this exemplary embodiment, a material having hardness greater than the material of the master disc for magnetic transfer is used as the material of the magnetic disc. Therefor, it is conceivable that small bumps and fine foreign particles that exist on the surface of the magnetic disc are removed by a close contact of the dummy master disc and the process of suctioning and force-feeding, rather than by transcription of a shape of dimples and ridges on the surface of the master disc onto the surface of the magnetic disc.

As has been described, an apparatus for magnetic transfer of this exemplary embodiment removes the foreign particles by executing the process of suctioning and force-feeding by using the dummy master disc having hardness lower than the magnetic disc to smooth the surface of the magnetic disc, and carries out the process of magnetic transfer to the magnetic disc with the master disc for magnetic transfer. Accordingly, this exemplary embodiment enables the apparatus for magnetic transfer to the magnetic disc having nearly no foreign particles or anomalous bumps, and to manufacture magnetic discs of high quality with extremely smooth surfaces.

INDUSTRIAL APPLICABILITY

As described above, in a manufacturing method for magnetically transferring a pattern of magnetic film of a master disc for magnetic transfer into a surface of a disc according to the present invention, a surface of the master disc for magnetic transfer can be cleaned, kept smooth and free from burrs by repeating suctioning and forcefully feeding between a dummy disc and the master disc for magnetic transfer prior to the transferring into a regular magnetic disc, thereby realizing manufacture of magnetic discs of high quality.

Furthermore, according to the present invention, foreign particles adhering on a surface of the master disc for magnetic transfer can be removed reliably with a measurement of the surface of the master disc for magnetic transfer after completing the magnetic transfer, and by repeating the suctioning and forced feeding of gas between the dummy disc and the master disc for magnetic transfer when the foreign particles are detected on the surface of the master disc for magnetic transfer, thereby realizing an apparatus for magnetic transfer of high durability and the magnetic discs of high quality.

In addition, according to the present invention, fine foreign particles in existence on the magnetic disc can be removed by using material greater in hardness than material of the master disc for magnetic transfer for the magnetic disc, and by repeating the suctioning and forced feeding of gas between a dummy master disc and the regular magnetic disc, thereby realizing manufacture of the magnetic discs of high quality with extremely smooth surfaces.

What is claimed is:

1. An apparatus for magnetic print, comprising:
    a master disc retaining unit for retaining a master disc having a magnetic part of ferromagnetic thin film formed on a disc-like substrate, pattern corresponding to data signals formed on the master disc;
    a disc retaining unit for selectively retaining a disc-like medium or a magnetic recording medium; and
    a magnetizing unit for applying magnetic field to the magnetic part of said master disc,
    wherein at least one of said master disc retaining unit and said disc retaining unit bring at least one of the magnetic part of the master disc and the disc-like medium toward the other a plurality of times, overlap position between said master disc and said disc like medium is different each of said times, and thereafter overlapping said master disc and said magnetic recording medium; said magnetizing unit magnetizes the magnetic part to magnetically print the pattern corresponding to the data signals formed on the master disc onto said magnetic recording medium.

2. The apparatus for magnetic print as recited in claim 1, wherein the master disc and the disc-like medium are decentered so that the master disc and the disc-like medium are retained in said master disc retaining unit and said disc retaining unit in a manner to confront eccentrically with respect to each other.

* * * * *